(12) United States Patent
Ohira

(10) Patent No.: US 12,292,631 B2
(45) Date of Patent: May 6, 2025

(54) DISPLAY DEVICE

(71) Applicant: Japan Display Inc., Tokyo (JP)

(72) Inventor: Hirofumi Ohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/745,107

(22) Filed: Jun. 17, 2024

(65) Prior Publication Data

US 2024/0427181 A1    Dec. 26, 2024

(30) Foreign Application Priority Data

Jun. 20, 2023    (JP) .................................. 2023-101034

(51) Int. Cl.
| | |
|---|---|
| *G02F 1/139* | (2006.01) |
| *G02F 1/13* | (2006.01) |
| *G02F 1/133* | (2006.01) |
| *G02F 1/1335* | (2006.01) |
| *G02F 1/1337* | (2006.01) |

(52) U.S. Cl.
CPC ........ *G02F 1/1323* (2013.01); *G02F 1/13306* (2013.01); *G02F 1/133528* (2013.01); *G02F 1/133784* (2013.01); *G02F 1/1396* (2013.01)

(58) Field of Classification Search
CPC .. G02F 1/1323; G02F 1/13306; G02F 1/1335; G02F 1/133528; G02F 1/1336; G02F 1/133615; G02F 1/1337; G02F 1/133773; G02F 1/133784; G02F 1/1343; G02F 1/134363; G02F 1/1396
See application file for complete search history.

(56) References Cited

U.S. PATENT DOCUMENTS

2021/0333580 A1* 10/2021 Matsushima ......... G02F 1/1323

FOREIGN PATENT DOCUMENTS

| CN | 109212848 A | * | 1/2019 | ........... G02F 1/1323 |
| JP | 2006-195388 A | | 7/2006 | |

OTHER PUBLICATIONS

Patent Translate CN 109212848 (Jan. 15, 2019).*

* cited by examiner

*Primary Examiner* — Thoi V Duong
(74) *Attorney, Agent, or Firm* — K&L Gates LLP

(57) ABSTRACT

A display device includes: a display panel; a light source configured to emit light toward one surface side of the display panel; a liquid crystal panel interposed between the display panel and the light source and provided to be able to change a transmission degree of light between the display panel and the light source; and a controller configured to control a potential difference between two electrodes facing each other with liquid crystal interposed therebetween. The liquid crystal panel in operation is makes a transmission degree of light tilted toward one side in a longitudinal direction of the display panel in a rectangular shape and a transmission degree of light tilted toward the other side in the longitudinal direction to be different from each other. The potential difference corresponds to an angle of tilt with a smaller transmission degree of light when the liquid crystal panel is in operation.

4 Claims, 15 Drawing Sheets

COMPARISON BETWEEN E MODE AND O MODE

FIRST-DIRECTION TRANSMISSION CHARACTERISTICS OF E MODE AND O MODE

DISPLAY DEVICE

CROSS-REFERENCE TO RELATED APPLICATION

This application claims the benefit of priority from Japanese Patent Application No. 2023-101034 filed on Jun. 20, 2023, the entire contents of which are incorporated herein by reference.

BACKGROUND

1. Technical Field

What is disclosed herein relates to a display device.

2. Description of the Related Art

In display devices, there is a demand to restrict the range of view angles in which an image can be viewed. For example, a display device mounted on a vehicle such as a four-wheel automobile is desired to achieve a view angle range in which an image can be viewed from the front passenger seat side and the image cannot be viewed from the driver seat side only during driving. To achieve such a view angle range, Japanese Patent Application Laid-open Publication No. 2006-195388 discloses technologies in which a liquid crystal panel for light adjustment is placed over an image display panel.

There has been a demand to allow more flexible setting of a view angle range in a display device capable of restricting the view angle range in which an image can be viewed. For example, the display device may be mounted on four-wheel automobiles of a plurality of types. The positional relation between the driver seat and the display device may be different among four-wheel automobiles of different types. There has been a demand for a display device capable of restricting the view angle range in which an image can be viewed, in accordance with the individual positional relation between the driver seat and the display device of each of the four-wheel automobiles of a plurality of types. Furthermore, it has been desired to be able to more flexibly determine the view angle range in which an image can be viewed not only in four-wheel automobiles but also in any environment where the display device may be provided. With conventional display devices, it has been difficult to meet such desires.

For the foregoing reasons, there is a need for a display device capable of more flexibly setting a view angle range in which an image can be viewed.

SUMMARY

According to an aspect, a display device includes: a display panel having a display region configured to output an image; a light source configured to emit light toward one surface side of the display panel; a liquid crystal panel interposed between the display panel and the light source and provided to be able to change a transmission degree of light between the display panel and the light source; and a controller configured to control a potential difference between two electrodes facing each other with liquid crystal interposed between the electrodes in the liquid crystal panel. The liquid crystal panel in operation makes a transmission degree of light tilted toward one side in a longitudinal direction of the display panel in a rectangular shape with respect to a direction in which the display panel and the light source face each other and a transmission degree of light tilted toward the other side in the longitudinal direction to be different from each other. The potential difference corresponds to an angle of tilt with a smaller transmission degree of light when the liquid crystal panel is in operation.

DETAILED DESCRIPTION

An embodiment of the present disclosure is described below with reference to the drawings. What is disclosed herein is only an example, and any modification that can be easily conceived by those skilled in the art while maintaining the main purpose of the invention are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
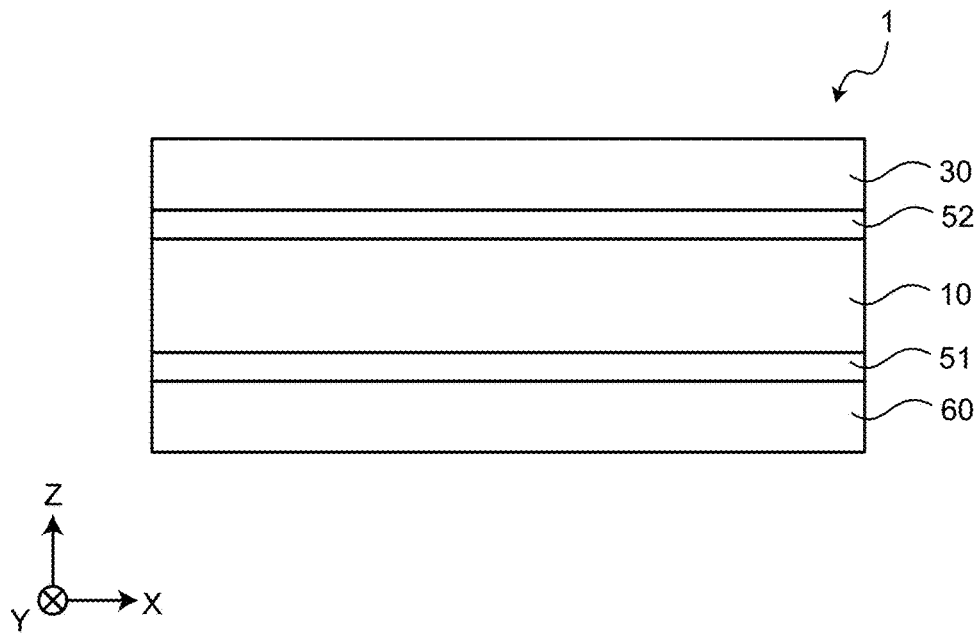
FIG. 1 is a schematic view illustrating an example of a main configuration of a display device according to an embodiment.

FIG. 1 is a schematic view illustrating an example of a main configuration of a display device 1 according to an embodiment. The display device 1 includes a light adjuster 10, a display panel 30, a light source 60, a retardation generation layer 51, and a retardation generation layer 52. A third direction Z is defined to be a direction in which the light adjuster 10, the display panel 30, the light source 60, the retardation generation layer 51, and the retardation generation layer 52 are stacked. A first direction X is defined to be one of two directions orthogonal to the third direction Z, and a second direction Y is defined to be the other direction thereof. The first direction X and the second direction Y are orthogonal to each other. In the display device 1, the light source 60, the retardation generation layer 51, the light adjuster 10, the retardation generation layer 52, and the display panel 30 are stacked in the stated order from one side in the third direction Z toward the other side.

Figure 2:
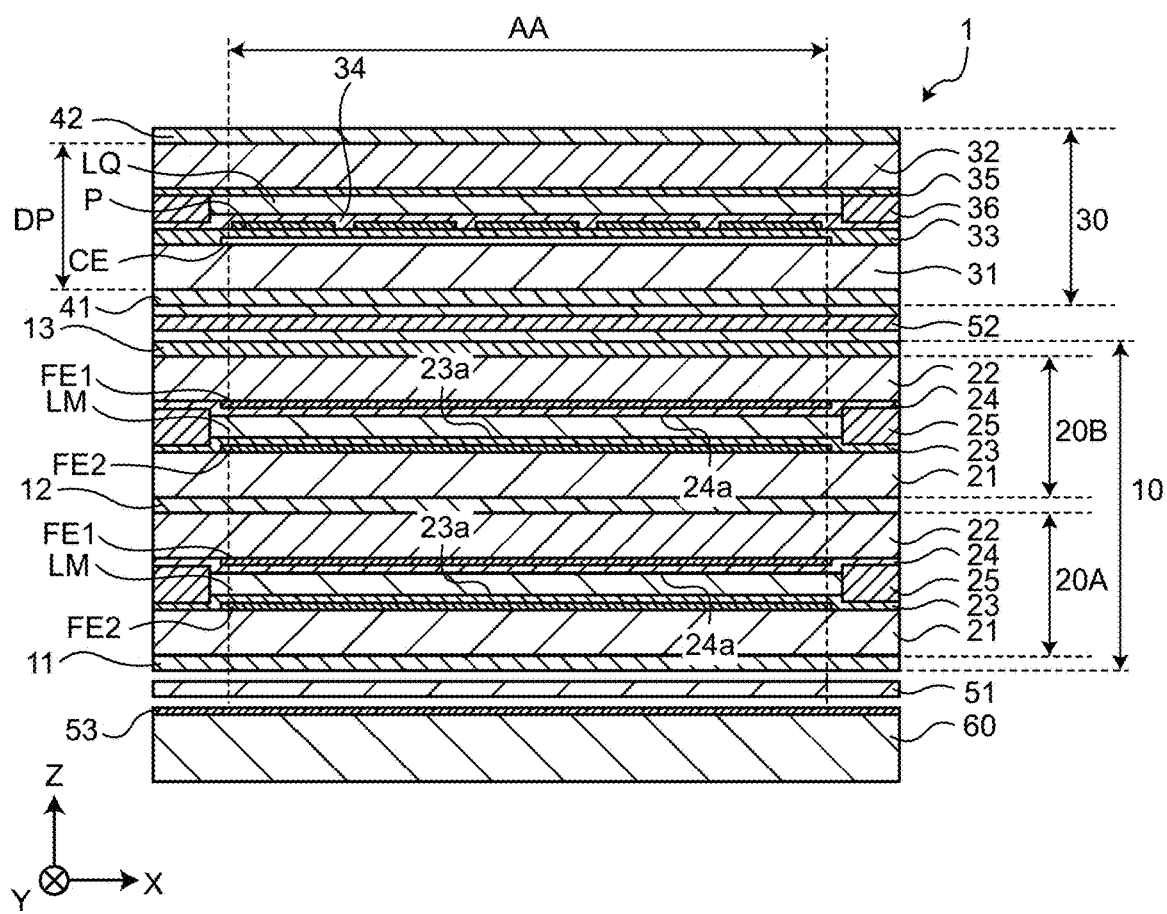
FIG. 2 is a schematic sectional view of components included in the display device.

FIG. 2 is a schematic sectional view of components included in the display device 1. FIG. 2 illustrates gaps provided between the light source 60 and the retardation generation layer 51, between the retardation generation layer 51 and the light adjuster 10, between the light adjuster 10 and the retardation generation layer 52, and between the retardation generation layer 52 and the display panel 30, respectively. The gaps, however, are illustrated to facilitate understanding of the diagram and are unnecessary in the actual display device 1 (refer to FIG. 1).

The light adjuster 10 has a configuration in which a first polarization layer 11, a first liquid crystal panel 20A, a second polarization layer 12, a second liquid crystal panel 20B, and a third polarization layer 13 are stacked from the one side in the third direction Z toward the other side. The first polarization layer 11, the second polarization layer 12, and the third polarization layer 13 as well as a fourth polarization layer 41 and a fifth polarization layer 42 to be described later are each an optical member provided to most transmit light polarized in a specific direction. The specific direction is referred to as a transmission axis direction. The transmission axis direction extends along a polarization plate. Accordingly, the transmission axis direction is orthogonal to the third direction Z. A direction orthogonal to the transmission axis direction and the third direction Z is referred to as an absorption axis direction. The absorption axis direction is a polarization direction in which light is most unlikely to pass through the polarization plate.

The first liquid crystal panel 20A and the second liquid crystal panel 20B are liquid crystal panels. The first liquid crystal panel 20A and the second liquid crystal panel 20B have the same device configuration except that they are provided at different positions. Hereinafter, the phrase "liquid crystal panel 20" collectively means the first liquid crystal panel 20A and the second liquid crystal panel 20B. Thus, description related to the liquid crystal panel 20 is applicable to both the first liquid crystal panel 20A and the second liquid crystal panel 20B. The liquid crystal panel 20 of the embodiment is a liquid crystal panel of what is called a twisted nematic (TN) type.

The liquid crystal panel 20 has a configuration in which a first substrate 21 is provided on the one side of liquid crystal LM and a second substrate 22 is provided on the other side thereof. The first substrate 21 and the second substrate 22 are light-transmitting substrates. The light-transmitting substrates are, for example, glass substrates but not limited thereto and may be substrates of any other light-transmitting material. Hereinafter, the phrase "one surface" means a surface of a plate-shaped component on the one side in the third direction Z. The phrase "the other surface" means a surface of the plate-shaped component on the other side in the third direction Z.

An electrode FE2 is formed on the other surface of the first substrate 21. An electrode FE1 is formed on one surface of the second substrate 22. The electrodes FE2 and FE1 are electrodes provided to cover a display region AA. The other surface of the electrode FE2 and the other surface of the first substrate 21 in an area where the electrode FE2 is not formed are covered by an insulating layer 23. One surface of the electrode FE1 and the one surface of the second substrate 22 in an area where the electrode FE1 is not formed are covered by an insulating layer 24. The display region AA will be described later.

At least one of the electrodes FE2 and FE1 is provided so that its potential can be changed in accordance with ON and OFF of operation of the liquid crystal panel 20. In other words, voltage generated between the electrodes FE2 and FE1 is different between a case where the liquid crystal panel 20 is in operation (ON) and a case where the liquid crystal panel 20 is not in operation (OFF).

The liquid crystal LM is interposed at least in the display region AA between the insulating layer 23 and the insulating layer 24. A seal 25 is interposed between the insulating layer 23 and the insulating layer 24 outside the display region AA. Although not illustrated, the seal 25 is a frame-shaped member enclosing the liquid crystal LM when viewed at a viewpoint of viewing a plane (X-Y plane) orthogonal to the third direction Z from the front. The liquid crystal LM is surrounded by the seal 25 between the insulating layer 23 and the insulating layer 24, and thus, enclosed in the liquid crystal panel 20.

An alignment film 23a is provided on the other surface of the insulating layer 23 at least in an area where the display region AA is covered. An alignment film 24a is provided on one surface of the insulating layer 24 at least in an area where the display region AA is covered. The alignment films 23a and 24a align the orientation of each liquid crystal molecule contained in the liquid crystal LM with a particular direction. The orientation of each liquid crystal molecule changes as the potential difference between the electrodes FE2 and FE1 changes.

The display panel 30 is a liquid crystal panel different from the liquid crystal panel 20. The display panel 30 includes a plurality of pixels. The display panel 30 is an image-display liquid crystal panel provided to be able to individually control the transmission degree of light at the position of each pixel in accordance with image data input from the outside.

The display panel 30 illustrated in FIG. 2 is a liquid crystal panel of what is called an in-plane switching (IPS) type. In the display panel 30, a pixel substrate 31 is provided on one side of liquid crystal LQ in the third direction Z, and a counter substrate 32 is provided on the other side thereof. In addition, the fourth polarization layer 41 is provided on one surface side of the pixel substrate 31. The fifth polarization layer 42 is provided on the other surface side of the counter substrate 32. Hereinafter, the phrase "panel DP" means part of the configuration of the display panel 30 other than the fourth polarization layer 41 and the fifth polarization layer 42.

For example, a common electrode CE, an insulating layer 33, pixel electrodes P, and an insulating layer 34 are stacked on the other surface of the pixel substrate 31 from the one side in the third direction Z toward the other side. A color filter 35 or the like is stacked on one surface of the counter substrate 32. A seal 36 is interposed between the insulating layer 34 and the color filter 35 outside the display region AA. The seal 36 has the same shape as the seal 25 described above. The liquid crystal LQ is surrounded by the seal 36 between the insulating layer 34 and the color filter 35, and thus, enclosed in the display panel 30.

The display region AA is a region in which a plurality of pixel electrodes P are disposed in the display panel 30. The pixel electrodes P are two-dimensionally arranged along an X-Y plane in the display region AA. The display panel 30 is a display panel of what is called an active matrix type, which is provided to be able to display and output any desired image by individually controlling the transmission degree of light at each pixel electrode P. More specifically, in the display panel 30 of the embodiment, potential as a reference is provided to the common electrode CE. In addition, individual potentials (pixel signals) are provided to the pixel electrodes P, and accordingly, the transmission degrees of light at the pixel electrodes P are individually controlled. Thus, the display region AA is a region in which an image is displayed and output.

The retardation generation layers 51 and 52 are optical members each of which causes the optical retardation of light entering from the one side in the third direction Z and transmit the light to the other side in the third direction Z. The retardation generation layers 51 and 52 of the embodiment are what is called ½ wave plates.

The light source 60 emits light toward the other surface side where a polarization generation layer 53 is provided. The polarization generation layer 53 is an optical member that converts light emitted from the other surface of the light source 60 into polarized light at a specific angle. The polarization generation layer 53 is, for example, a dual brightness enhancement film (DBEF) but not limited thereto and only needs to be a component that can convert light emitted from the other surface of the light source 60 into polarized light at the specific angle. Light emitted by the light source 60 is exited from the other surface side of the display device 1 through the polarization generation layer 53, the light adjuster 10, the fourth polarization layer 41, the display panel 30, and the fifth polarization layer 42.

Figure 3:
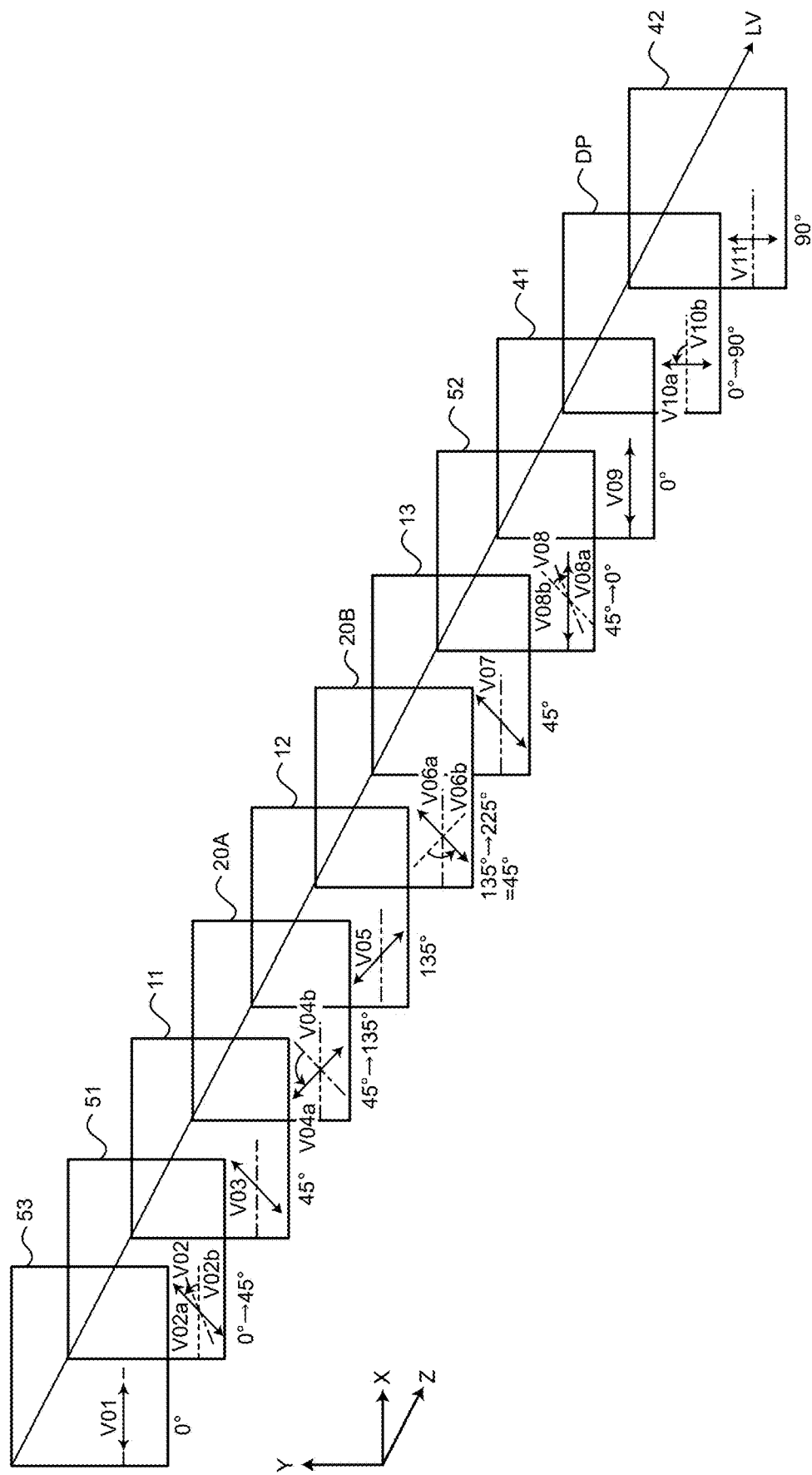
FIG. 3 is a diagram illustrating changes in the polarization direction of light from when light is emitted by a light source to when the light is exited from the other surface side of the display device.

The following describes changes in the polarization direction of light from when light is emitted by the light source 60 to when the light is exited from the other surface side of the display device 1, with reference to FIG. 3.

FIG. 3 is a diagram illustrating changes in the polarization direction of light from when light is emitted by the light source 60 to when the light is exited from the other surface side of the display device 1. In the following description, polarized light in the first direction X is defined as polarized light at 0°. In description with reference to FIG. 3, the angle of polarization is expressed in a minor angle smaller than 180° with respect to the polarized light at 0°. In description with reference to FIG. 3, of the changes in the polarization direction of light, a change with anticlockwise rotation by r° along an X-Y plane is referred to as a "change of +r°", and a change with opposite (clockwise) rotation by r° is referred to as a "change of −r°". The variable r is a real number equal to or larger than zero.

In the embodiment, a polarization axis direction V01 of the polarization generation layer 53 is set so that light emitted from the other surface of the light source 60 is converted into polarized light at 0° and transmitted. Thus, polarized light having passed through the polarization generation layer 53 and incident on the retardation generation layer 51 is polarized light at 0°.

The retardation generation layer 51 is a ½ wave plate as described above. The retardation generation layer 51 of the embodiment causes change in the anticlockwise (+) direction. A slow axis direction V02 of the retardation generation layer 51 is set so as to be at +22.5° relative to the polarized light (0°) passing through the polarization generation layer 53. Accordingly, polarized light undergoes a change of +45° while passing through the retardation generation layer 51. Thus, polarized light having passed through the retardation generation layer 51 and incident on the first polarization layer 11 is polarized light at 45°. FIG. 3 illustrates an angle V02b of the polarized light incident on the retardation generation layer 51 and an angle V02a of the polarized light having passed through the retardation generation layer 51.

A transmission axis direction V03 of the first polarization layer 11 is set to allow maximum transmission of polarized light at 45°. Thus, light having passed through the retardation generation layer 51 can pass through the first polarization layer 11. Polarized light having passed through the first polarization layer 11 and incident on the first liquid crystal panel 20A is polarized light at 45°.

The liquid crystal panel 20 is provided to apply a change of +90° to polarized light passing therethrough from the one side in the third direction Z to the other side. In other words, the polarized light undergoes the change of +90° while passing through the first liquid crystal panel 20A. Thus, polarized light having passed through the first liquid crystal panel 20A and incident on the second polarization layer 12 is polarized light at 135°. FIG. 3 illustrates an angle V04b of polarized light incident on the first liquid crystal panel 20A and an angle V04a of polarized light having passed through the first liquid crystal panel 20A.

A transmission axis direction V05 of the second polarization layer 12 is set to allow maximum transmission of polarized light at 135°. Thus, light having passed through the first liquid crystal panel 20A can pass through the second polarization layer 12. Polarized light having passed through the second polarization layer 12 and incident on the second liquid crystal panel 20B is polarized light at 135°.

Polarized light undergoes the change of +90° while passing through the second liquid crystal panel 20B. Thus, polarized light having passed through the second liquid crystal panel 20B and incident on the third polarization layer 13 is polarized light at 225°, which is the same as polarized light at 45°. FIG. 3 illustrates an angle V06b of polarized light incident on the second liquid crystal panel 20B and an angle V06a of polarized light having passed through the second liquid crystal panel 20B.

A transmission axis direction V07 of the third polarization layer 13 is set to allow maximum transmission of polarized light at 45°. Thus, light having passed through the second liquid crystal panel 20B can pass through the third polarization layer 13. Polarized light having passed through the third polarization layer 13 and incident on the retardation generation layer 52 is polarized light at 45°.

The retardation generation layer 52 is a ½ wave plate as described above. The retardation generation layer 52 of the embodiment causes a change in the clockwise (−) direction. A slow axis direction V08 of the retardation generation layer 52 is set so as to be at −22.5° relative to polarized light (45°) passing through the polarization generation layer 53. Accordingly, polarized light undergoes a change of −45° while passing through the retardation generation layer 52. Thus, polarized light having passed through the retardation generation layer 52 and incident on the fourth polarization layer 41 is polarized light at 0°. FIG. 3 illustrates an angle V08b of polarized light incident on the retardation generation layer 52 and an angle V08a of polarized light having passed through the retardation generation layer 52.

A transmission axis direction V09 of the fourth polarization layer 41 is set to allow maximum transmission of polarized light at 0°. Thus, light having passed through the retardation generation layer 52 can pass through the fourth polarization layer 41. Polarized light having passed through the fourth polarization layer 41 and incident on the panel DP is polarized light at 0°.

The panel DP is provided to apply a change of +90° to polarized light passing therethrough from the one side in the third direction Z to the other side. In other words, polarized light undergoes the change of +90° while passing through the panel DP. Thus, polarized light having passed through the panel DP and incident on the fifth polarization layer 42 is polarized light at 90°. FIG. 3 illustrates an angle V10b of polarized light incident on the panel DP and an angle V10a of polarized light having passed through the panel DP.

A transmission axis direction V11 of the fifth polarization layer 42 is set to allow maximum transmission of polarized light at 90°. Thus, light having passed through the panel DP can pass through the fifth polarization layer 42. In this manner, a transmission path LV of light from the light source 60 to the other surface side of the fifth polarization layer 42 is formed.

The liquid crystal panel 20 will be more specifically described below with reference to FIGS. 4 to 7.

Figure 4:
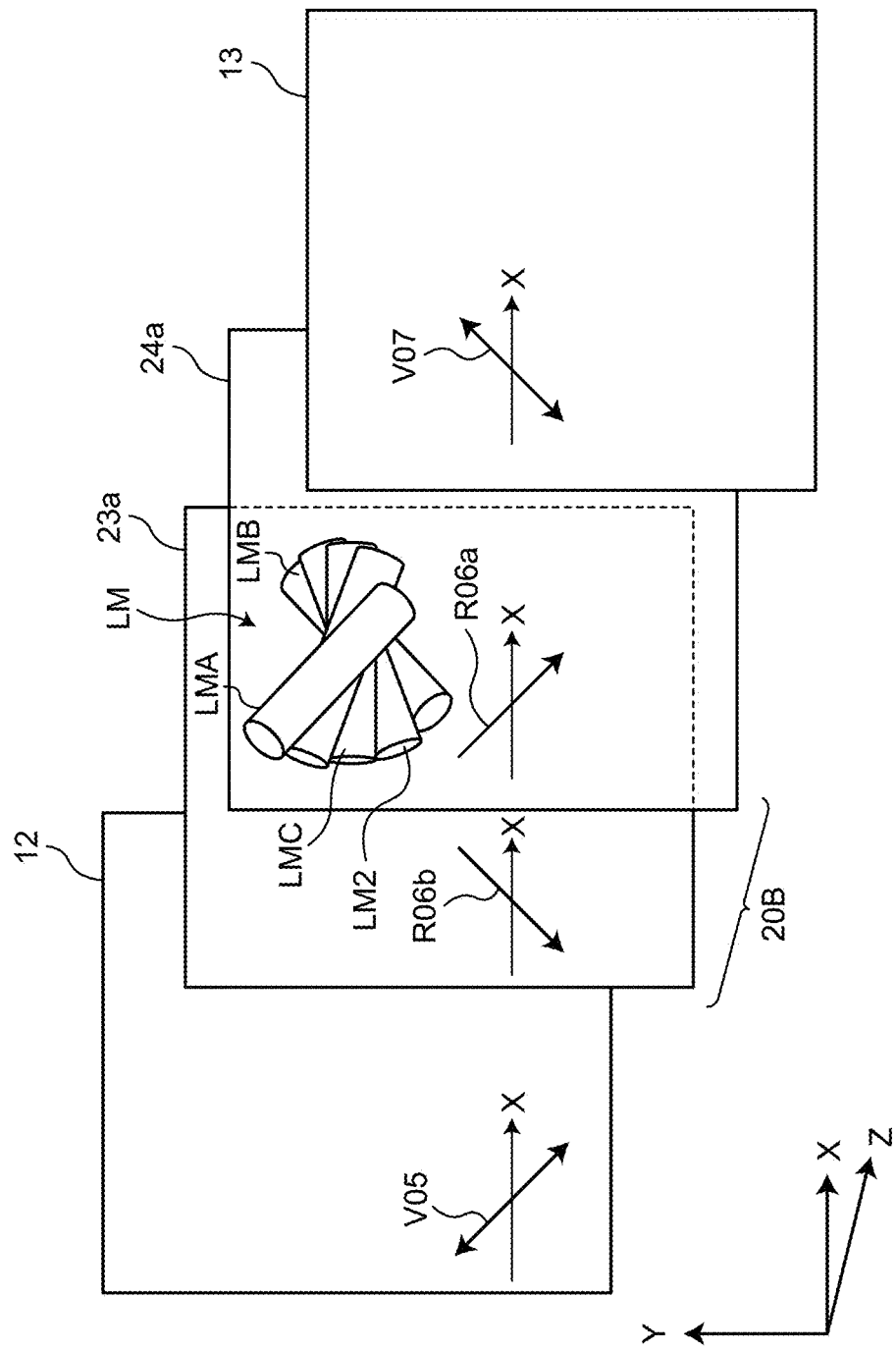
FIG. 4 is a diagram illustrating the relation of rubbing directions R06a and R06b of respective alignment films included in a second liquid crystal panel with transmission axis directions of a second polarization layer and a third polarization layer disposed facing in a third direction with the second liquid crystal panel interposed therebetween.

FIG. 4 is a diagram illustrating the relation of rubbing directions R06a and R06b of the respective alignment films 23a and 24a included in the second liquid crystal panel 20B with the transmission axis directions of the second polarization layer 12 and the third polarization layer 13 disposed facing each other in the third direction Z with the second liquid crystal panel 20B interposed therebetween. In description with reference to FIG. 4 and FIG. 7 to be described later, a direction toward one side in the first direction X (the right side in FIG. 4) is defined as a direction at 0°. A direction having an angle formed anticlockwise relative to the direction at 0° is defined as a direction at a positive (+) angle (°), and a direction having an angle formed clockwise is defined as a direction at a negative (−) angle (°).

The alignment films 23a and 24a are each provided with rubbing treatment on a contacting surface side with the liquid crystal LM to align the orientation of each liquid crystal molecule with a particular direction. The particular direction provided by the rubbing treatment is a rubbing direction. The rubbing direction R06b of the alignment film 23a is at 225° (−135°). The rubbing direction R06a of the alignment film 24a is at 315° (−45°).

The alignment film 23a is stacked on the other surface of the first substrate 21 in the second liquid crystal panel 20B, and the second polarization layer 12 faces one surface of the first substrate 21. As illustrated in FIGS. 3 and 4, a transmission axis direction V05 of the second polarization layer 12 is at 135°. Accordingly, the rubbing direction R06b of the alignment film 23a and the transmission axis direction V05 of the second polarization layer 12 are orthogonal to each other.

The alignment film 24a is stacked on one surface of the second substrate 22 in the second liquid crystal panel 20B, and the third polarization layer 13 faces the other surface of the second substrate 22. As illustrated in FIGS. 3 and 4, a transmission axis direction V07 of the third polarization layer 13 is at 45°. Accordingly, the rubbing direction R06a of the alignment film 24a and the transmission axis direction V07 of the third polarization layer 13 are orthogonal to each other.

As described above with reference to FIG. 4, in the second liquid crystal panel 20B of the embodiment, the rubbing direction of an alignment film stacked on a substrate and the orientation axis of a polarization layer contacting the substrate are orthogonal to each other. In other words, the second liquid crystal panel 20B is provided as what is called an O-mode liquid crystal panel.

As described above, the first liquid crystal panel 20A and the second liquid crystal panel 20B have the same configuration of a liquid crystal panel (the liquid crystal panel 20). Accordingly, the rubbing direction R06b of the alignment film 23a on one surface side of the first liquid crystal panel 20A is at 225° (−135°) as in the second liquid crystal panel 20B. A transmission axis direction V03 of the first polarization layer 11 disposed on the one surface side of the first liquid crystal panel 20A is at 45°. The rubbing direction R06a of the alignment film 24a on the other surface side of the first liquid crystal panel 20A is at 315° (−45°) as in the second liquid crystal panel 20B. The transmission axis direction V05 of the second polarization layer 12 disposed on the other surface side of the first liquid crystal panel 20A is at 135°.

Accordingly, in the first liquid crystal panel 20A of the embodiment, the rubbing direction of an alignment film stacked on a substrate and the orientation axis of a polarization layer contacting the substrate are parallel to each other. In other words, the first liquid crystal panel 20A is provided as what is called an E-mode liquid crystal panel.

More specifically, the shape of each liquid crystal molecule contained in the liquid crystal LM can be regarded as a prolate spheroid. The long axis direction of the prolate spheroid is defined as an "ne ($n_{extraordinary}$) axis". The short axis direction of the prolate spheroid orthogonal to the ne axis is defined as an "no ($n_{ordinary}$) axis". In the E mode, the rubbing direction of the alignment film 23a is set so that the transmission axis direction of the polarization layer facing the alignment film 23a with the first substrate 21 interposed therebetween is aligned with the ne axis, and the rubbing direction of the alignment film 24a is set so that the transmission axis direction of the polarization layer facing the alignment film 24a with the second substrate 22 interposed therebetween is aligned with the ne axis. In the O mode, the rubbing direction of the alignment film 23a is set so that the transmission axis direction of the polarization layer facing the alignment film 23a with the first substrate 21 interposed therebetween is aligned with the no axis, and the rubbing direction of the alignment film 24a is set so that the transmission axis direction of the polarization layer facing the alignment film 24a with the second substrate 22 interposed therebetween is aligned with the no axis.

A rubbing direction does not limit polarized light passing therethrough. In other words, the alignment films 23a and 24a transmit light irrespective of their rubbing directions.

Figure 5:
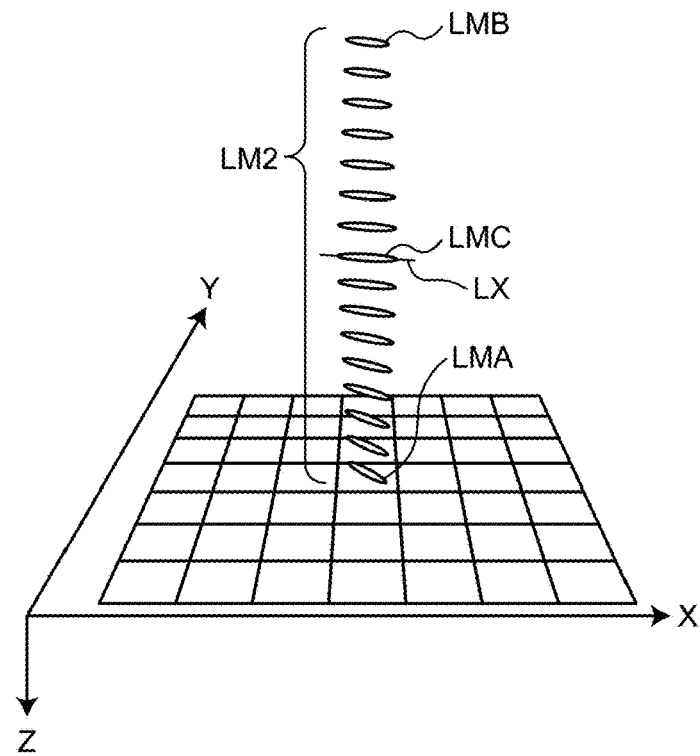
FIG. 5 is a diagram illustrating the orientations of liquid crystal molecules when a liquid crystal panel is not in operation (OFF)
Figure 6:
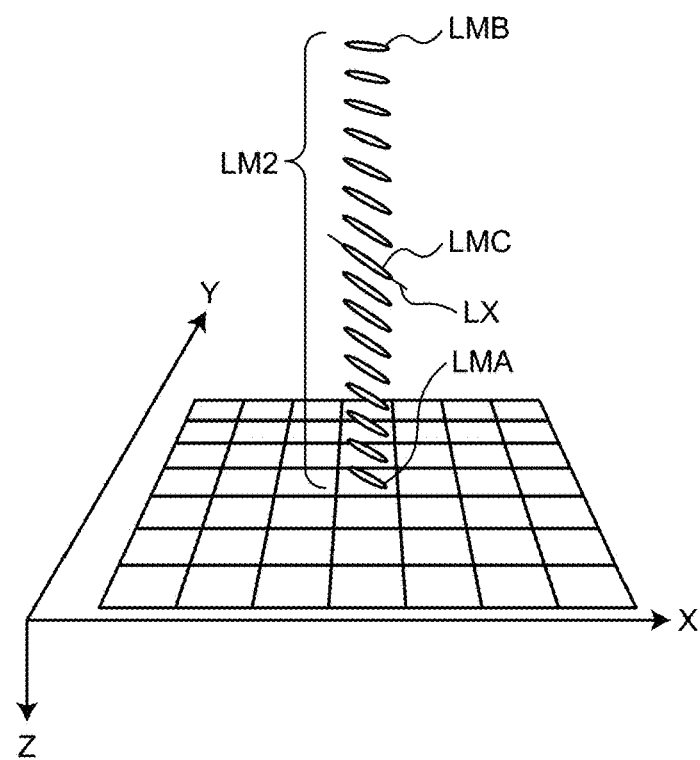
FIG. 6 is a diagram illustrating the orientations of liquid crystal molecules when a liquid crystal panel is in operation (ON)

The rubbing directions of the alignment films 23a and 24a affect the orientations of liquid crystal molecules contained in the liquid crystal LM. In FIG. 4 and FIGS. 5 and 6 to be described later, liquid crystal molecules LM2 are illustrated as liquid crystal molecules contained in the liquid crystal LM. Among the liquid crystal molecules LM2, a liquid crystal molecule positioned on the alignment film 23a side and oriented in the rubbing direction R06b is specially illustrated as a liquid crystal molecule LMB. Among the liquid crystal molecules LM2, a liquid crystal molecule positioned on the alignment film 24a side and oriented in the rubbing direction R06a is specially illustrated as a liquid crystal molecule LMA. Among the liquid crystal molecules LM2, a liquid crystal molecule at an approximately intermediate position between the liquid crystal molecule LMA and the liquid crystal molecule LMB in the third direction Z is specially illustrated as a liquid crystal molecule LMC.

As illustrated in FIG. 4, among the liquid crystal molecules LM2, those closer to the alignment film 23a are oriented in directions closer to the rubbing direction R06b, and those closer to the alignment film 24a are oriented in directions closer to the rubbing direction R06a when viewed at a viewpoint of viewing an X-Y plane from the front. With such continuity of change in liquid crystal molecule orientation across the liquid crystal molecules LM2 arranged in the third direction z, the liquid crystal panel 20 applies the change of +90° to polarized light passing therethrough from the one side in the third direction Z to the other side.

FIG. 5 is a diagram illustrating the orientations of the liquid crystal molecules LM2 when the liquid crystal panel 20 is not in operation (OFF). FIG. 6 is a diagram illustrating the orientations of the liquid crystal molecules LM2 when the liquid crystal panel 20 is in operation (ON). As described above, the liquid crystal panel 20 is a liquid crystal panel of the TN type. Accordingly, when the liquid crystal panel 20 is not in operation (OFF), a long axis direction LX of each liquid crystal molecule LM2 is substantially aligned with an X-Y plane as illustrated in FIG. 5. When the liquid crystal panel 20 is in operation (ON), the orientation of each liquid crystal molecule LM2 changes in accordance with the potential difference between the electrodes FE2 and FE1 (refer to FIG. 2) so that the long axis direction LX is closer to the third direction Z. Accordingly, when the liquid crystal panel 20 is in operation (ON), the long axis direction LX of each liquid crystal molecule LM2 intersects an X-Y plane as illustrated in FIG. 6.

When the liquid crystal panel 20 is not in operation (OFF) as described above with reference to FIG. 5, the transmission degree of light on one side in the first direction X is hardly different from that on the other side in the first direction X. Specifically, when the first liquid crystal panel 20A and the second liquid crystal panel 20B are both not in operation (OFF) and an image DSP (refer to FIG. 9) on the display device 1 is viewed from each of two viewpoints that are line symmetric in the first direction X with respect to a viewpoint of viewing the display device 1 from the front, the brightnesses of the image recognized at the two viewpoints are substantially equal to each other. Hereinafter, the phrase "image DSP" means an image displayed and output by the display panel 30 of the display device 1. In this case, at a viewpoint of viewing the display device 1 from the front, the image can be viewed with a brightness equal to or higher than brightnesses at other viewpoints. In other words, when the liquid crystal panel 20 is not in operation (OFF), the transmission degree of light along the third direction Z through the liquid crystal panel 20 is equal to or larger than the transmission degree of light intersecting the third direction Z through the liquid crystal panel 20.

When the liquid crystal panel 20 is in operation (ON) as described above with reference to FIG. 6, the transmission degree of light on the one side in the first direction X is different from that on the other side in the first direction X. The following describes a view angle characteristic of the display device 1 that is obtained in accordance with the transmission degree of light when the liquid crystal panel 20 is in operation (ON), with reference to FIG. 7.

Figure 7:
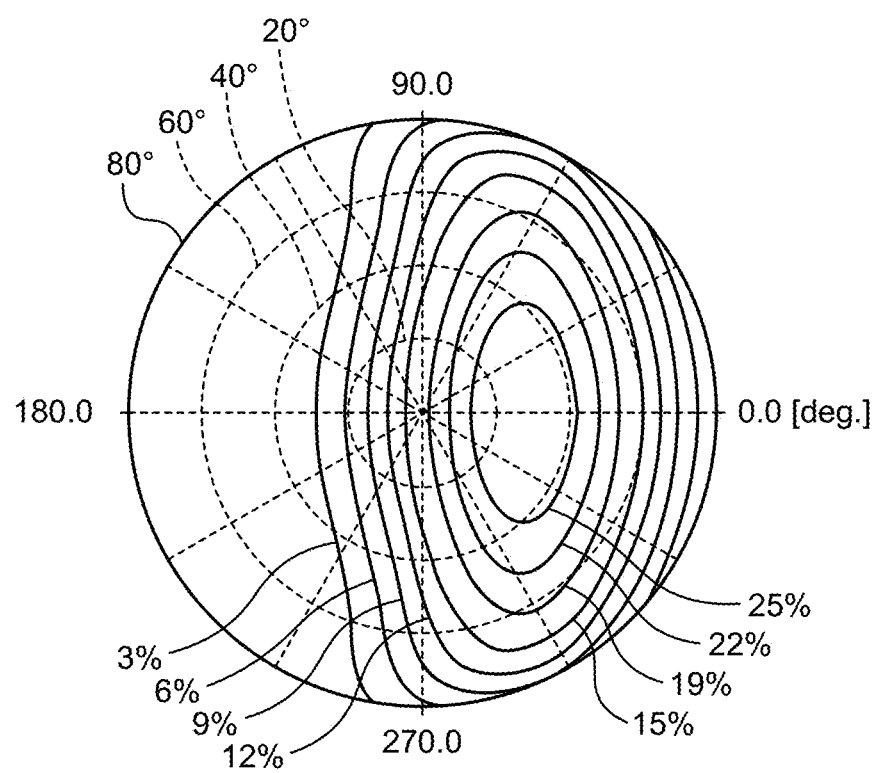
FIG. 7 is a diagram illustrating an exemplary view angle characteristic of the display device that is obtained in accordance with the transmission degree of light when a liquid crystal panel is in operation (ON)

FIG. 7 is a diagram illustrating an exemplary view angle characteristic of the display device 1 that is obtained in accordance with the transmission degree of light when the liquid crystal panel 20 is in operation (ON). The center of concentric circles in FIG. 7 corresponds to the normal of the display device 1 in the third direction Z, and the concentric circles centered at the normal indicate tilt angles of 20°, 40°, 60°, and 80°, respectively, with respect to the normal. This illustrated characteristic diagram is obtained by connecting regions of transmittances in respective directions that are equal to each other.

As illustrated in FIG. 7, relatively high transmittance of light is obtained when user's line of sight toward the display device 1 is tilted toward one side (0°) in the first direction X. Relatively high transmittance of light is also obtained when user's line of sight toward the display device 1 is aligned with the normal direction, in other words, when the user views the display device 1 from the front. However, when user's line of sight toward the display device 1 is tilted toward the other side (180°) in the first direction X, the transmittance of light significantly decreases as compared to the case of tilt toward the one side. In particular, when the tilt angle of the line of sight toward the other side (180°) in the first direction X is exceeds 30°, the transmittance is 3% or lower in the example illustrated in FIG. 7 and the brightness is so low that the image substantially cannot be viewed by a human.

The view angle characteristic described above with reference to FIG. 7 can be utilized for display output control intended to allow a user viewing the display device 1 from the front or viewing the display device 1 from the one side in the first direction X to view the image but not to allow a user viewing the display device 1 from the other side in the first direction X to view the image. An example in which such a display output control is applied will be described below with reference to FIG. 8.

Figure 8:
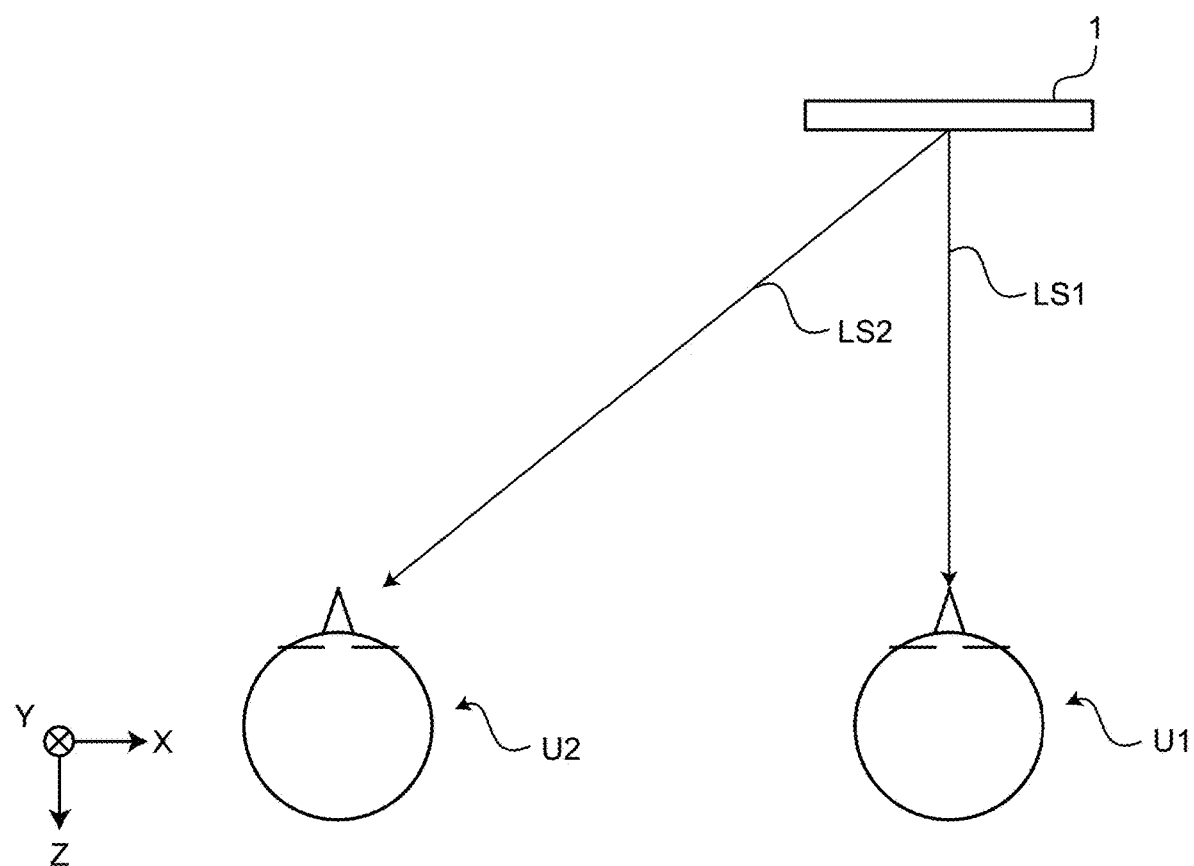
FIG. 8 is a schematic diagram illustrating an example of the relation between the display device, a user who can view an image regardless of whether each liquid crystal panel is in operation or not in operation (ON or OFF), and a user who cannot view the image when each liquid crystal panel is in operation (ON)

FIG. 8 is a schematic diagram illustrating an example of the relation between the display device 1, a user U1 who can view the image DSP regardless of whether each liquid crystal panel 20 is in operation or not in operation (ON or OFF), and a user U2 who cannot view the image DSP when each liquid crystal panel 20 is in operation (ON).

As illustrated in FIG. 8, the display device 1 and the user U1 face each other in the third direction Z. Although not illustrated in FIG. 8, the other surface side of the display device 1, in other words, the fifth polarization layer 42 side is the user U1 side in FIG. 8. Thus, in display output by the display device 1, light LS1 of the image toward the user U1 is along the third direction Z. In such a positional relation the display device 1 and the user U1, it can be expressed that the user U1 is located at a viewpoint of viewing the display device 1 from the front. The user U2 is located at a position of obliquely viewing the other surface side of the display device 1 in a direction tilted toward the other side in the first direction X relative to the third direction Z. In other words, in display output by the display device 1, light LS2 of the image toward the user U2 is tilted toward the other side (180° in FIG. 7) in the first direction X. In such a positional relation the display device 1 and the user U2, it can be expressed that the user U2 is located at a viewpoint of obliquely viewing the display device 1.

A case where the positional relation between the display device 1 and the users U1 and U2 as illustrated in FIG. 8 is established is, for example, a case where the display device 1 is provided in a four-wheel automobile in which the user U2 is seated in the driver seat and the user U1 is seated in the front passenger seat, but is not limited thereto. The positional relation can be established, for example, in a case where the display device 1 is provided as a personal monitor for each passenger on an aircraft such as a passenger airplane, and any other case may be included.

Figure 9:
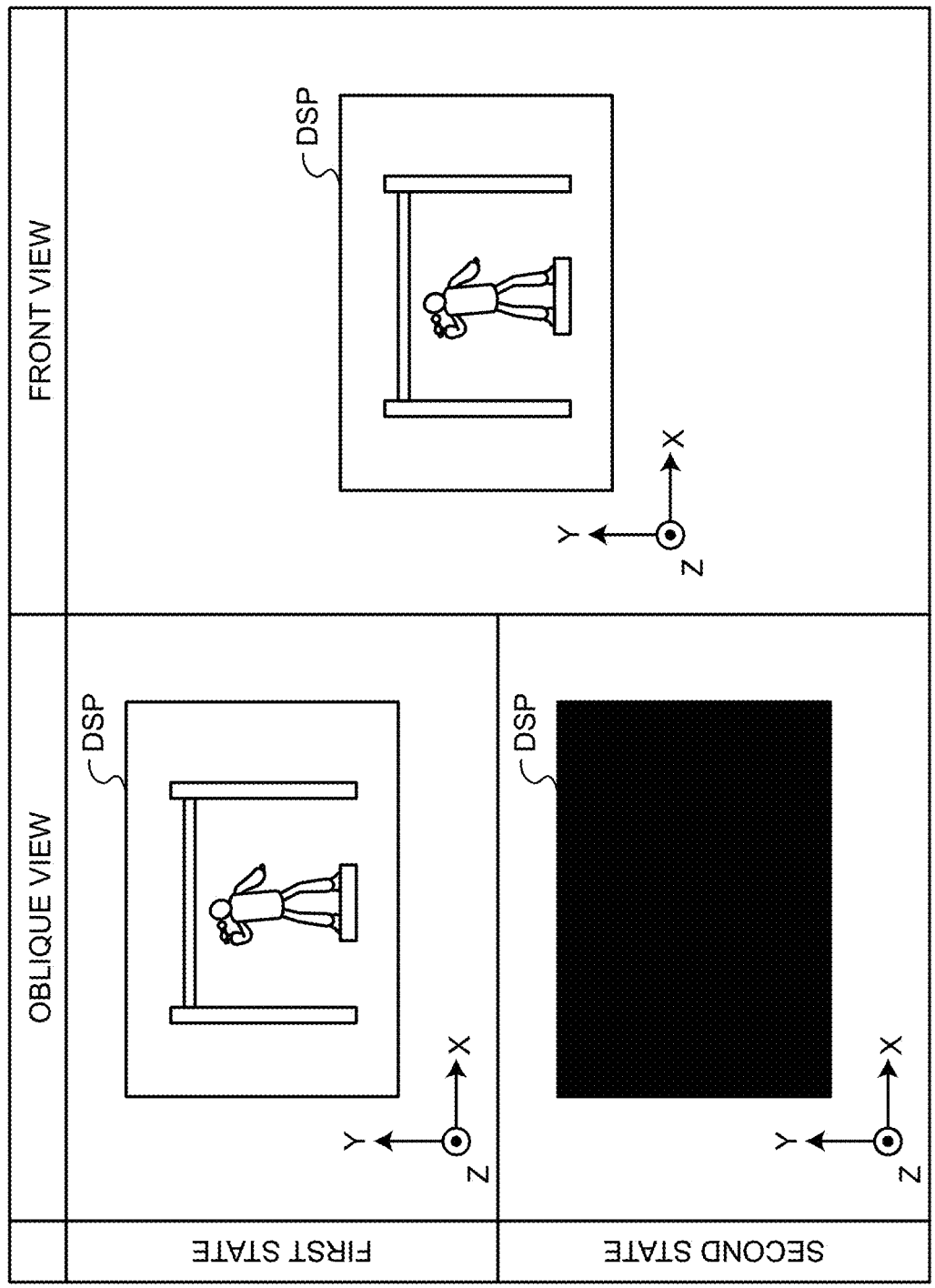
FIG. 9 is a schematic view illustrating a difference in the images viewed by a user viewing the display device from the front and a user obliquely viewing the display device.

FIG. 9 is a schematic view illustrating a difference in the images DSP viewed by a user viewing the display device 1 from the front and a user obliquely viewing the display device 1. The user viewing the display device 1 from the front is, for example, the user U1 in FIG. 8. The user obliquely views the display device 1 is, for example, the user U2 in FIG. 8. In description with reference to FIG. 9, a state of the display device 1 in which the display panel 30 performs the image display and the liquid crystal panel 20 is not in operation (OFF) is referred to as a first state. A state of the display device 1 in which the display panel 30 performs the image display and the liquid crystal panel 20 is in operation (ON) is referred to as a second state.

As described above, a degree that light along the third direction Z passes through the liquid crystal panel 20 when the liquid crystal panel 20 is not in operation (OFF) is equal to or larger than a degree that light intersecting the third direction Z passes through the liquid crystal panel 20. As described above with reference to FIG. 7, when a user views the display device 1 from the front, relatively high transmittance of light is obtained even while the liquid crystal panel 20 is in operation (ON). Thus, a user viewing the display device 1 from the front can view the image DSP illustrated in FIG. 9 irrespective of whether the operation state of the display device 1 is the first state or the second state. The aspect of the image DSP illustrated in FIG. 9 is merely exemplary and the present disclosure is not limited thereto. The display panel 30 may display and output any desired image.

As described above with reference to FIG. 7, when user's line of sight toward the display device 1 is tilted toward the other side (180°) in the first direction X while the liquid crystal panel 20 is in operation (ON), transmittance of light significantly decreases as compared to the case of tilt toward the one side. Thus, a user obliquely viewing the display device 1 from the other side in the first direction X substantially cannot view the image DSP when the operation state of the display device 1 is the second state. However, when the operation state of the display device 1 is the first state, such significant decrease in the transmittance of light as described above with reference to FIG. 7 does not occur even for the other side (180°) in the first direction X. Thus, when the operation state of the display device 1 is in the first state, a user obliquely viewing the display device 1 from the other side in the first direction X can view substantially the same image DSP as that for a user viewing the display device 1 from the front.

As illustrated in FIG. 9, the image DSP is viewed as a rectangular image. Accordingly, the display region AA has a rectangular shape corresponding to the image DSP illustrated in FIG. 9 when the display device 1 is viewed from the front. Two sides of the four sides of the rectangle extend along the first direction X, and the other two sides extend along the second direction Y. The light adjuster 10 of the embodiment causes the transmission degree of light tilted toward one side in the longitudinal direction of the rectangle (the first direction X) with respect to the third direction Z and the transmission degree of light tilted toward the other side in the longitudinal direction to be different from each other. Accordingly, the light adjuster 10 generates the difference in viewing between the first and second states described above with reference to FIG. 9.

As described above, the light adjuster 10 includes the first liquid crystal panel 20A provided as an E-mode liquid crystal panel and the second liquid crystal panel 20B provided as an O-mode liquid crystal panel. Optical characteristics attributable to mixture of the E-mode liquid crystal panel and the O-mode liquid crystal panel will be described below with reference to FIGS. 10 to 12.

Figure 10:
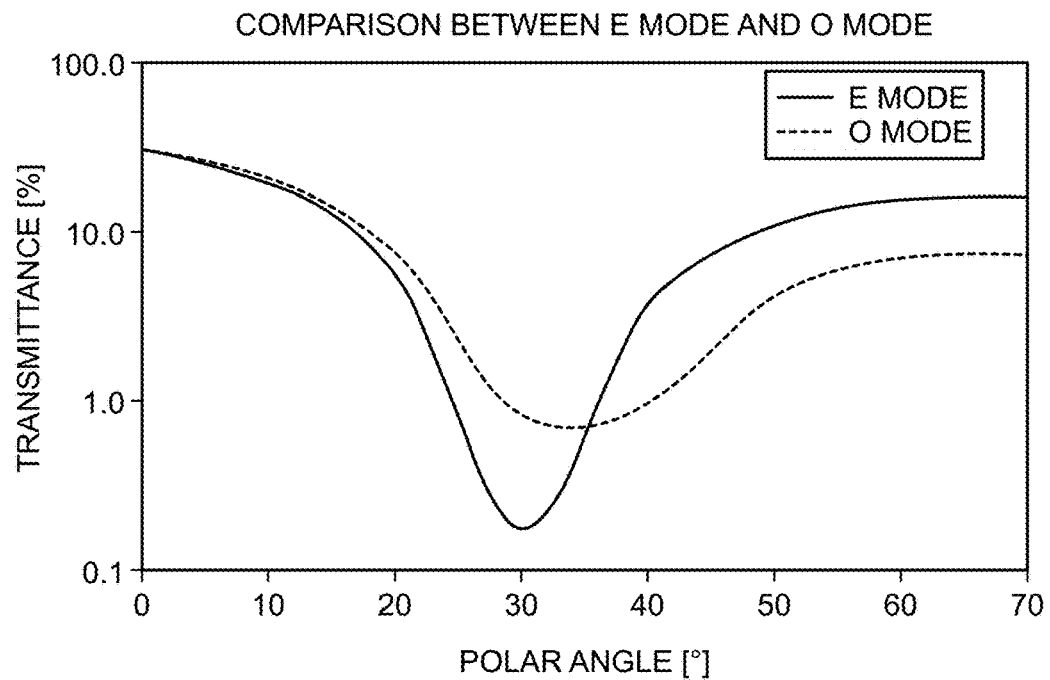
FIG. 10 is a graph illustrating the relation between a polar angle and the transmittance of light when an E-mode or O-mode liquid crystal panel is in operation (ON)

FIG. 10 is a graph illustrating the relation between a polar angle and the transmittance of light when the E-mode or O-mode liquid crystal panel 20 is in operation (ON). The horizontal axis (polar angle) in FIG. 10 and FIG. 14 to be described later represents the angle between the line of light tilted toward the other side in the first direction X (180.0 side in FIG. 7) in the description with reference to FIG. 7 and a reference (0°) that is an angle aligned with the third direction Z. The vertical axis (transmittance) represents the transmittance of light along a line corresponding to the polar angle represented by the horizontal axis.

As illustrated in FIG. 10, the relation between the polar angle and the transmittance of light when the liquid crystal panel 20 is in operation (ON) is different between the liquid crystal panel 20 (for example, the first liquid crystal panel 20A) provided as an E-mode liquid crystal panel and the liquid crystal panel 20 (for example, the second liquid crystal panel 20B) provided as an O-mode liquid crystal panel. Specifically, the graph illustrating the relation between the polar angle and the transmittance of the liquid crystal panel 20 provided as an E-mode liquid crystal panel has a deep valley shape in which the transmittance significantly decreases to less than 1% with a peak at the polar angle of 30°. However, the graph illustrating the relation between the polar angle and the transmittance of the liquid crystal panel 20 provided as an O-mode liquid crystal panel has a relatively gentle basin shape as compared to the E-mode graph, in which the transmittance is substantially 1% approximately between the polar angle of 30° and the polar angle of 40°.

The difference in optical characteristics between the E and O modes as described above with reference to FIG. 10 can be utilized to achieve a view angle characteristic that is more suitable for prevention of viewing of the image DSP on the display device 1 in the second state from the other side in the first direction X. Specifically, the light adjuster 10 includes one liquid crystal panel 20 (for example, the first liquid crystal panel 20A) provided as an E-mode liquid crystal panel and one liquid crystal panel 20 provided as an O-mode liquid crystal panel (for example, the second liquid crystal panel 20B) as described above with reference to FIGS. 3 and 4. Thus, it is possible to more reliably prevent viewing of the image DSP on the display device 1 in the second state from the other side in the first direction X.

Figure 11:
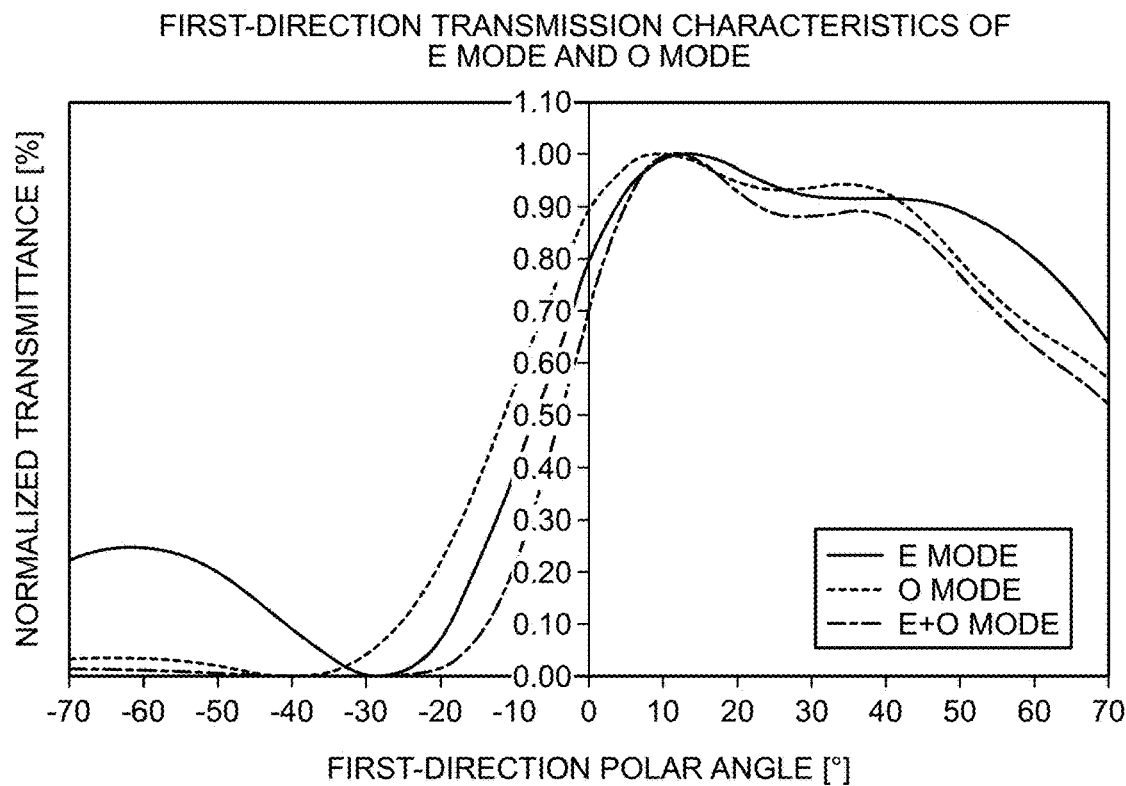
FIG. 11 is a graph illustrating the normalized transmittance of the display device in a second state when the display device includes the E-mode liquid crystal panel only, the O-mode liquid crystal panel only, or a combination of the E-mode liquid crystal panel and the O-mode liquid crystal panel.
Figure 12:
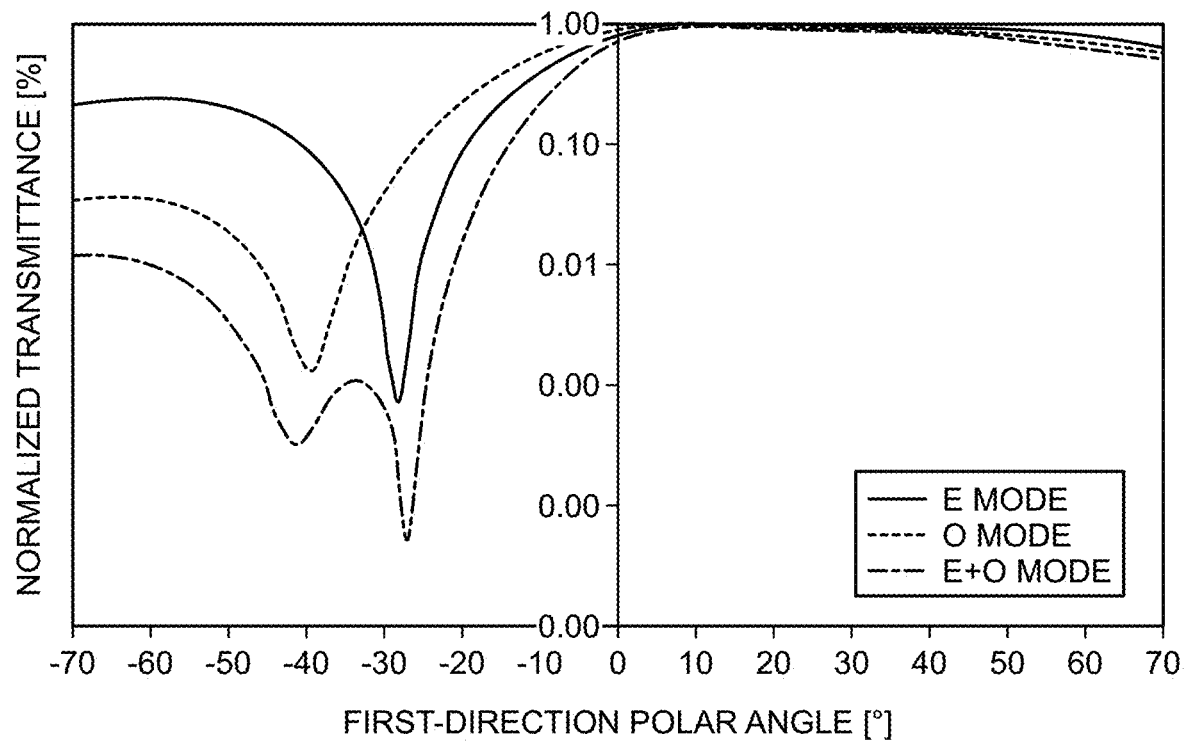
FIG. 12 is a graph illustrating the normalized transmittance of the display device in the second state when the display device includes the E-mode liquid crystal panel only, the O-mode liquid crystal panel only, or the combination of the E-mode liquid crystal panel and the O-mode liquid crystal panel.

FIGS. 11 and 12 are graphs illustrating the normalized transmittance of the display device 1 in the second state when the display device includes the E-mode liquid crystal panel only, the O-mode liquid crystal panel only, or a combination of the E-mode liquid crystal panel and the O-mode liquid crystal panel. "E MODE" illustrates a case of the E-mode liquid crystal panel only, in other words, a configuration in which the light adjuster 10 includes only the E-mode liquid crystal panel. "O MODE" illustrates a case of the O-mode liquid crystal panel only, in other words, a configuration in which the light adjuster 10 includes only the O-mode liquid crystal panel. "E+O MODE" illustrates a case of the combination of the E- and O-mode liquid crystal panels, in other words, a configuration in which the light adjuster 10 includes both the E-mode liquid crystal panel and O-mode liquid crystal panel as in the embodiment.

The normalized transmittance is a value of 0.0 to 1.0, which expresses the brightness of the image DSP that can be viewed by a user. The value of 1.0 is set as the brightness of the image at a view angle at which the image can be viewed brightest when the display device 1 is in operation, and the value of 0.0 is set as the brightness in a state with no light from the light source 60 (when the display device 1 is not in operation).

Figure 16:
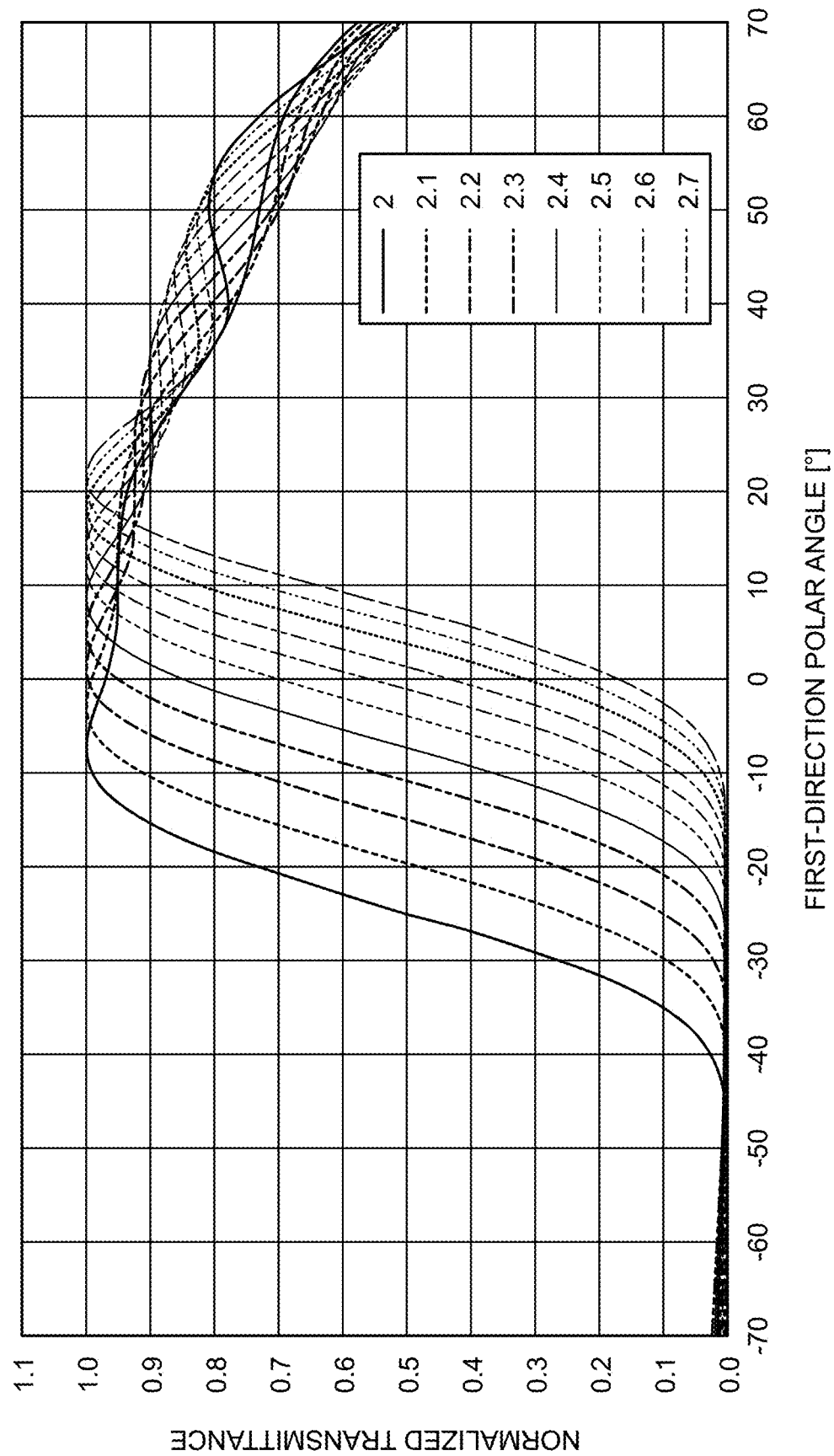
FIG. 16 is a graph illustrating an example of the normalized transmittance in each case where the voltage applied to liquid crystal is any voltage from 2 V to 2.7 V (in 0.1 V steps)

In FIG. 11 and FIG. 16 to be described later, the normalized transmittance of 0.00 to 1.00 is illustrated at equal intervals in the vertical axis direction. In FIG. 12, the value of the normalized transmittance is 1.0 at the upper end in the vertical axis direction and decreases by $\frac{1}{10}$ in each scale in the downward direction. The illustrated relation between the view angle and the normalized transmittance is the same between FIGS. 11 and 12 except that the manner of expression in the vertical axis direction is different therebetween. In the horizontal axis direction in FIGS. 11 and 12 and FIG. 16 to be described later, the line of sight at an angle tilted toward the one side in the first direction X with respect to a reference (view angle of 0°) at the line of sight for viewing the display device 1 from the front is regarded as a view angle of a positive (+) value, and the line of sight at an angle tilted toward the other side in the first direction X is regarded as a view angle of a negative (−) value.

In a case of a configuration in which the light adjuster 10 includes only the E-mode liquid crystal panel, the normalized transmittance is extremely close to 0 at the view angle of −30° but is 0.1 or larger at view angles on the positive (+) side of −20° and on the negative (−) side of −40°. In this manner, with the E-mode liquid crystal panel only, there remains the possibility that the image DSP unintentionally can be viewed when obliquely viewed if the view angle is even slightly deviated from −30°.

In a case of a configuration in which the light adjuster 10 includes only the O-mode liquid crystal panel, the normalized transmittance is approximately 0.1 or larger up to −25° approximately even when viewed from the other side in the first direction X. In this manner, with the O-mode liquid crystal panel only, prevention of viewing from the other side in the first direction X is possibly insufficient.

However, in a case of a configuration in which the light adjuster 10 includes both the E-mode and O-mode liquid crystal panels as in the embodiment, the normalized transmittance is significantly smaller than 0.1 when the view angle is on the negative side of −20°. Moreover, unlike the case of the E-mode liquid crystal panel only, the normalized transmittance is not 0.1 or larger even when the view angle is on the negative (−) side of −40°. In this manner, according to the embodiment, since the light adjuster 10 includes both the E-mode and O-mode liquid crystal panels, it is possible to more reliably prevent viewing of the image DSP on the display device 1 in the second state from the other side in the first direction X.

In the display device 1, the specific configuration of the display panel 30 that can be combined with the light adjuster 10 of the embodiment is not limited to the above-described liquid crystal panel of the IPS type. The display panel 30 may be a liquid crystal panel of another type as long as it is what is called a transmissive liquid crystal panel and includes a plurality of pixels in each of which the transmission degree of light is individually controllable in accordance with image data input from the outside. The following describes, with reference to FIG. 13, the configuration of pixels provided in a liquid crystal panel of the IPS type, which is employable as the display panel 30 of the embodiment.

Figure 13:
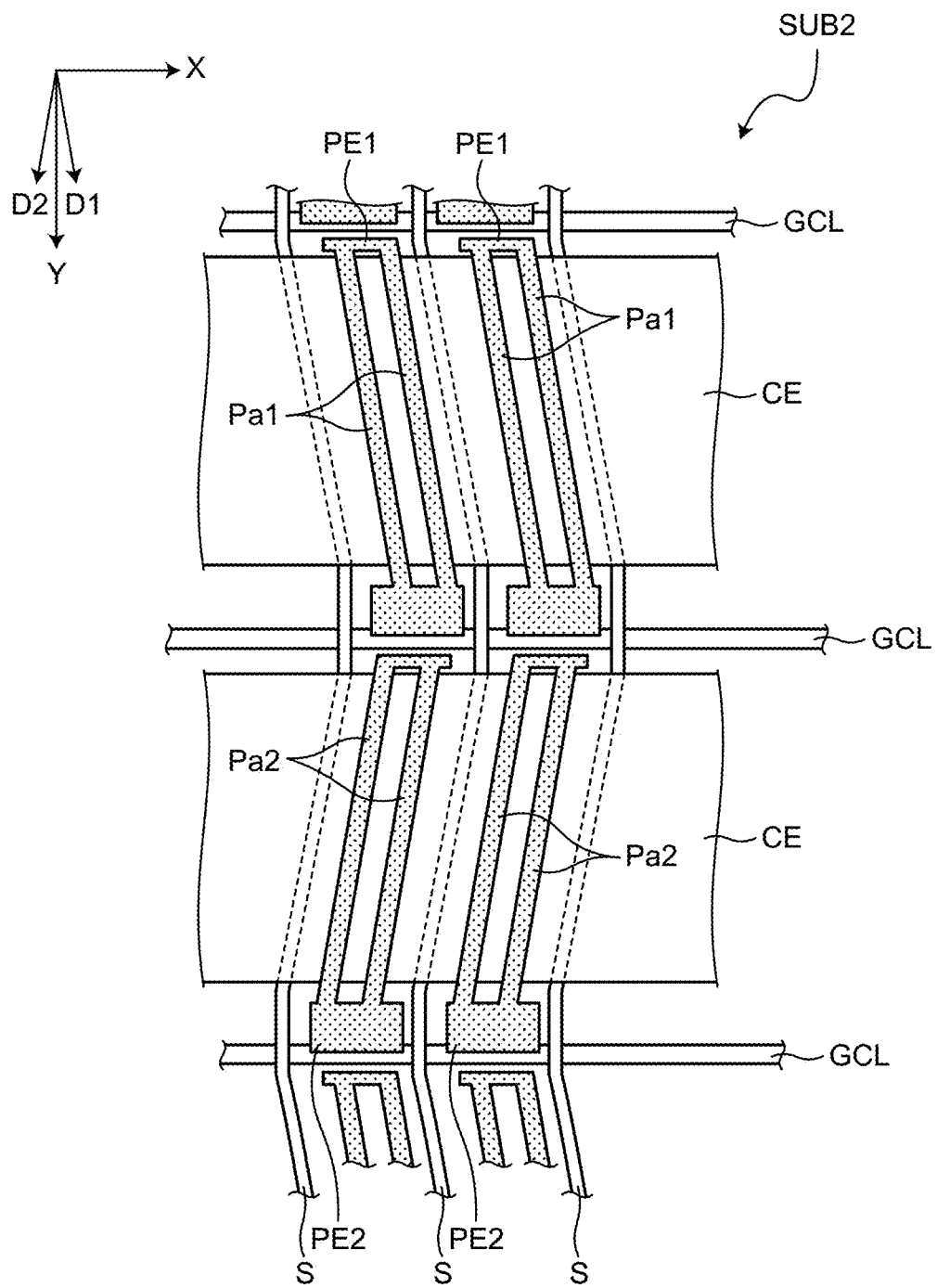
FIG. 13 is a plan view illustrating an example of a pixel arrangement in a display panel.

FIG. 13 is a plan view illustrating an example of a pixel arrangement in the display panel 30. FIG. 13 illustrates overlapping of pixel electrodes PE1 and PE2 and the common electrode CE when viewed from the fifth polarization layer 42 side. Each pixel electrode P described above with reference to FIG. 2 is the pixel electrode PE1 or PE2 in FIG. 13. The pixel substrate 31 includes a plurality of scanning lines GCL and a plurality of signal lines S. The scanning lines GCL each extend in the first direction X and are arranged at intervals in the second direction Y. The signal lines S each extend substantially in the second direction Y and are arranged at intervals in the first direction X.

A plurality of pixel electrodes PE1 are arranged in the first direction X. Each pixel electrode PE1 includes strip electrodes Pa1 overlap the common electrode CE. The strip electrodes Pa1 extend in a direction D1 different from the first direction X and the second direction Y. A plurality of pixel electrodes PE2 are arranged in the first direction X. Each pixel electrode PE2 includes strip electrodes Pa2 overlap the common electrode CE. The strip electrodes Pa2 extend in a direction D2 different from the direction D1. The numbers of strip electrodes Pa1 and Pa2 may be one or may be equal to or larger than three.

The following describes view angle control on the negative (−) side in the display device 1 operating in the second state with reference to FIGS. 14 to 17.

Figure 14:
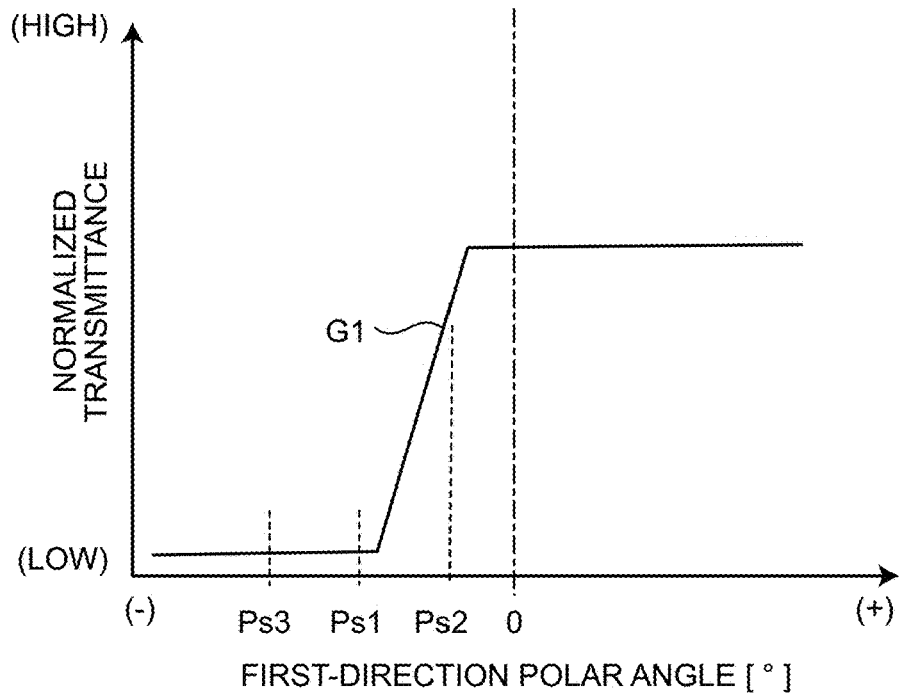
FIG. 14 is a diagram illustrating an example of the relation between three view angles on a negative (−) side and the magnitude of the normalized transmittance.
Figure 15:
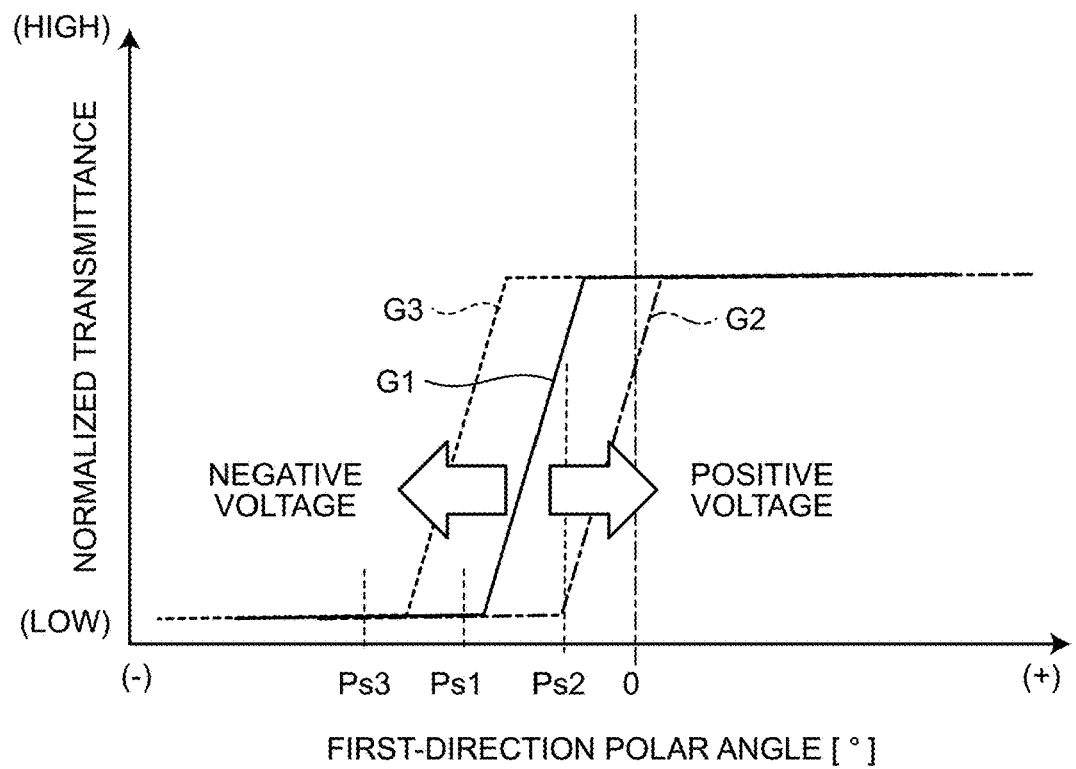
FIG. 15 is a diagram illustrating an example of the relation between the three view angles on the negative (−) side and control of the normalized transmittance by controlling voltage that is applied to liquid crystal.

FIG. 14 is a diagram illustrating an example of the relation between three view angles Ps1, Ps2, and Ps3 on the negative (−) side and the magnitude of the normalized transmittance. In FIG. 14 and FIG. 15 to be described later, for simplification of description, the normalized transmittance (for example, "E+O MODE") achieved by combination of two liquid crystal panels 20, which is described above with reference to FIG. 11, is illustrated with a broken-line graph G1.

For example, consider a case where the normalized transmittance illustrated by the graph G1 in FIG. 14 is set to prevent an image from being viewed from an oblique viewpoint by a user corresponding to the view angle Ps1. A "user corresponding to a view angle Psα" means a user viewing the display device 1 from a position where the view angle relative to the display device 1 when the user obliquely views an image displayed and output by the display device 1 is the view angle Psα. The α is a natural number. In this case, the user corresponding to the view angle Ps1 cannot view the image on the display device 1 operating in the second state as described above with reference to FIG. 9. In this case, a user corresponding to the view angle Ps3 on the negative (−) side of the view angle Ps1 in FIG. 14 cannot view the image on the display device 1 operating in the second state.

In FIG. 14, at the view angle Ps2 on the positive (+) side of the view angle Ps1, the normalized transmittance is significantly higher than that at the view angle Ps1. Thus, a user corresponding to the view angle Ps2 can possibly view the image.

There are various conditions related to determination of the positional relation between the display device 1 and a user obliquely viewing the display device 1. Thus, if the normalized transmittance of each liquid crystal panel 20 is limited to that described above with reference to FIG. 14, there is a possibility that the image is not completely prevented from being viewed by the user corresponding to the view angle Ps2 in FIG. 14.

Thus, in the embodiment, a view angle range is controlled in which the normalized transmittance can be lowered enough to sufficiently reduce viewing of the image by controlling voltage that is applied to the liquid crystal LM. The voltage applied to the liquid crystal LM corresponds to the potential difference between the potential of the electrode FE1 and the potential of the electrode FE2. Hereinafter, unless otherwise stated, the phrase "reference voltage" means the voltage applied to the liquid crystal LM when the relation between the normalized transmittance corresponding to the graph G1 illustrated in FIG. 14 and the view angle is established.

FIG. 15 is a diagram illustrating an example of the relation between the three view angles Ps1, Ps2, and Ps3 on the negative (−) side and control of the normalized transmittance by controlling the voltage that is applied to the liquid crystal LM. In FIG. 15, "POSITIVE VOLTAGE" indicates the change when the voltage applied to the liquid crystal LM becomes higher than the reference voltage. A graph G2 illustrated in FIG. 15 illustrates the normalized transmittance as an example of "POSITIVE VOLTAGE". In addition, "NEGATIVE VOLTAGE" indicates the change when the voltage applied to the liquid crystal LM becomes lower than the reference voltage. A graph G3 illustrates the normalized transmittance as an example of "NEGATIVE VOLTAGE".

As illustrated with "POSITIVE VOLTAGE" in FIG. 15, when the voltage applied to the liquid crystal LM is higher than the reference voltage, the image on the display device 1 operating in the second state cannot be viewed by the user corresponding to the view angle Ps2, as well. As illustrated with "NEGATIVE VOLTAGE" in FIG. 15, when the voltage applied to the liquid crystal LM is lower than the reference voltage, the image on the display device 1 operating in the second state cannot be viewed by the user corresponding to the view angle Ps3 but can be viewed by the user corresponding to the view angle Ps1.

The above description with reference to FIG. 15 is made on the basic principle of control of the normalized transmittance by controlling the voltage that is applied to the liquid crystal LM. Hereinafter, the relation between the voltage applied to the liquid crystal LM and the normalized transmittance will be described below in more detail with reference to FIGS. 16 and 17.

Figure 17:
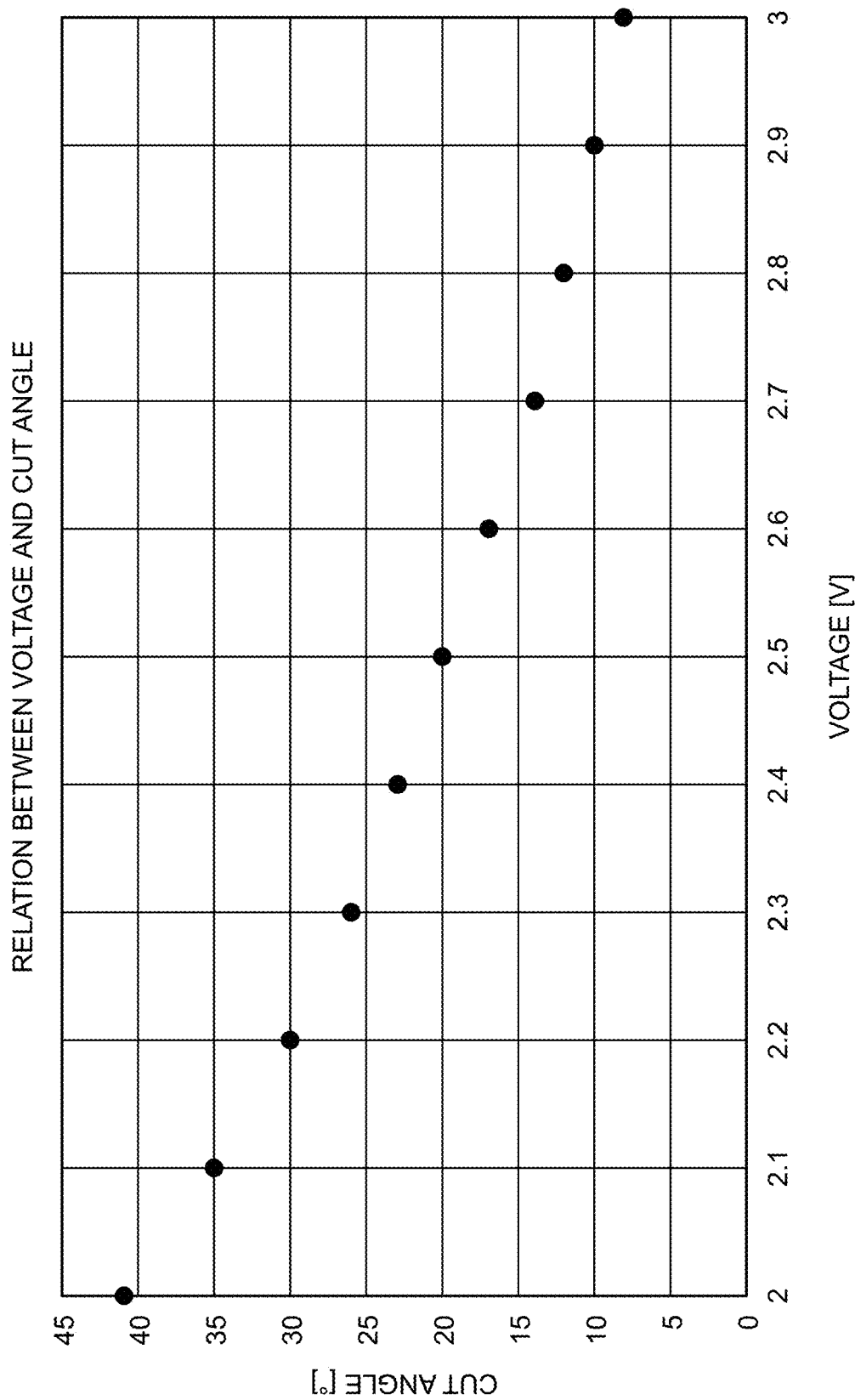
FIG. 17 is a graph illustrating an example of the relation between the voltage applied to liquid crystal and a cut angle.

FIG. 16 is a graph illustrating an example of the normalized transmittance in each case where the voltage applied to the liquid crystal LM is any voltage from 2 V to 2.7 V (in 0.1 V steps). FIG. 17 is a graph illustrating an example of the relation between the voltage applied to the liquid crystal LM and a cut angle. The horizontal axis in FIG. 17 represents the voltage applied to the liquid crystal LM. The cut angle represented by the vertical axis in FIG. 17 is a tilt angle in the first direction X relative to the display device 1 with 0° at the angle of the line of sight for viewing the display device 1 from the front and is a minimum tilt angle at which the image is viewed with a luminance lower than the luminance of the image when the display device 1 is viewed from the front (or in a state in which the image substantially cannot be viewed). For example, in a case where the cut angle is 10°, a user viewing the display device 1 with a line of sight tilted in the first direction X by 10° or more relative to the line of sight (0°) for viewing the display device 1 from the front views the image at a luminance lower than the luminance of the image when the display device 1 is viewed from the front, or substantially cannot view the image. In a case of the display device 1 with a view angle range in which the normalized transmittance is substantially zero on the negative (−) side as illustrated in FIG. 16, each numerical value of the cut angle illustrated in FIG. 17 is interpreted as the absolute value of a negative (−) numerical value. In a case of the display device 1 with a view angle range in which the normalized transmittance is substantially zero on the positive (+) side, each numerical value of the cut angle illustrated in FIG. 17 is interpreted as a positive (+) numerical value.

As illustrated in FIG. 16, the relation between the polar angle and the normalized transmittance corresponds to the voltage applied to the liquid crystal LM. Specifically, as the voltage applied to the liquid crystal LM shifts from 2 V to 2.7 V in 0.1 V steps, a view angle range in which the normalized transmittance is substantially zero, a polar angle at which the normalized transmittance is lowest, a polar angle at which the normalized transmittance is highest, the relation between the normalized transmittance and the polar angle, which is expressed by a curved graph between the lowest normalized transmittance and the highest normalized transmittance, and the relation between the normalized transmittance and the polar angle, which is expressed by a curved graph on the positive (+) side of the highest normalized transmittance all shift from the negative (−) side to the positive (+) side. Thus, viewing of the image by a disallowed user can be prevented by setting, to the display device 1, the voltage that is applied to the liquid crystal LM with which a polar angle assumed as the view angle of the disallowed user is included in the view angle range in which the normalized transmittance is substantially zero. The disallowed user is a user who should not be allowed to view the image. Moreover, viewing of the image by an allowed user can be enabled by setting a polar angle to be or in proximity to the view angle with the highest normalized transmittance. The allowed user is a user who is allowed to view the image.

With the same idea as in the description with reference to FIG. 16, the cut angle can be adjusted in accordance with the voltage that is applied to the liquid crystal LM as illustrated in FIG. 17, and thus a view angle characteristic of the display device 1 with both disallowed and allowed users taken into account can be achieved by setting the cut angle to a polar angle between a polar angle assumed as the view angle of the disallowed user and a polar angle assumed as the view angle of the allowed user.

In this manner, the voltage that is applied to the liquid crystal LM, in other words, the potential difference between the electrodes FE2 and FE1 corresponds to the view angle range in which the normalized transmittance is substantially zero. In reality, as described above, the view angle range in which the normalized transmittance is substantially zero, the polar angle at which the normalized transmittance is lowest, the polar angle at which the normalized transmittance is highest, the relation between the normalized transmittance and the polar angle, which is expressed by a curved graph between the lowest normalized transmittance and the highest normalized transmittance, and the relation between the normalized transmittance and the polar angle, which is expressed by a curved graph on the positive (+) side of the highest normalized transmittance shift in accordance with shift of the voltage applied to the liquid crystal LM, but this application voltage control is performed mainly for controlling the view angle range in which the normalized transmittance is substantially zero.

As described above with reference to FIGS. 7, 14, 15, 16, and the like, the light adjuster 10 makes a first transmission degree and a second transmission degree different from each other. The first transmission degree is the transmission degree of light tilted, with respect to the direction (third direction Z) in which the display panel 30 and the light source 60 face each other, toward one side (at a polar angle on the negative (−) side) in one direction (for example, the first direction X that is the longitudinal direction of the display panel 30) along two sides facing each other among the four sides of the display panel 30 in a rectangular shape. The second transmission degree is the transmission degree of light tilted toward the other side (at a polar angle on the positive (+) side). When the light adjuster 10 is in operation, in other words, in the second state, the angle (polar angle at which the normalized transmittance is lowest) of tilt at which the transmission degree of light is lowest is included in either the one side or the other side. Since the voltage applied to the liquid crystal LM, in other words, the potential difference between the electrodes FE2 and FE1, is controlled mainly for controlling the view angle range in which the normalized transmittance is substantially zero, the potential difference corresponds to the angle of tilt with a smaller transmission degree of light when the liquid crystal panel 20 is in operation. As described above with reference to FIGS. 16 and 17, the angle of tilt at which the transmission degree of light is lowest relative to the facing direction (third direction Z) is smaller as the potential difference is larger. The view angle range in which the normalized transmittance is substantially zero is a set of view angles assumed to make it difficult or impossible to view the image output by the display panel 30 when the liquid crystal panel 20 is in operation (in the second state).

An assumed example of the positional relation between the view angle of the display device 1 as described above and a user having a line of sight toward the display device 1 will be described below with reference to FIG. 18.

Figure 18:
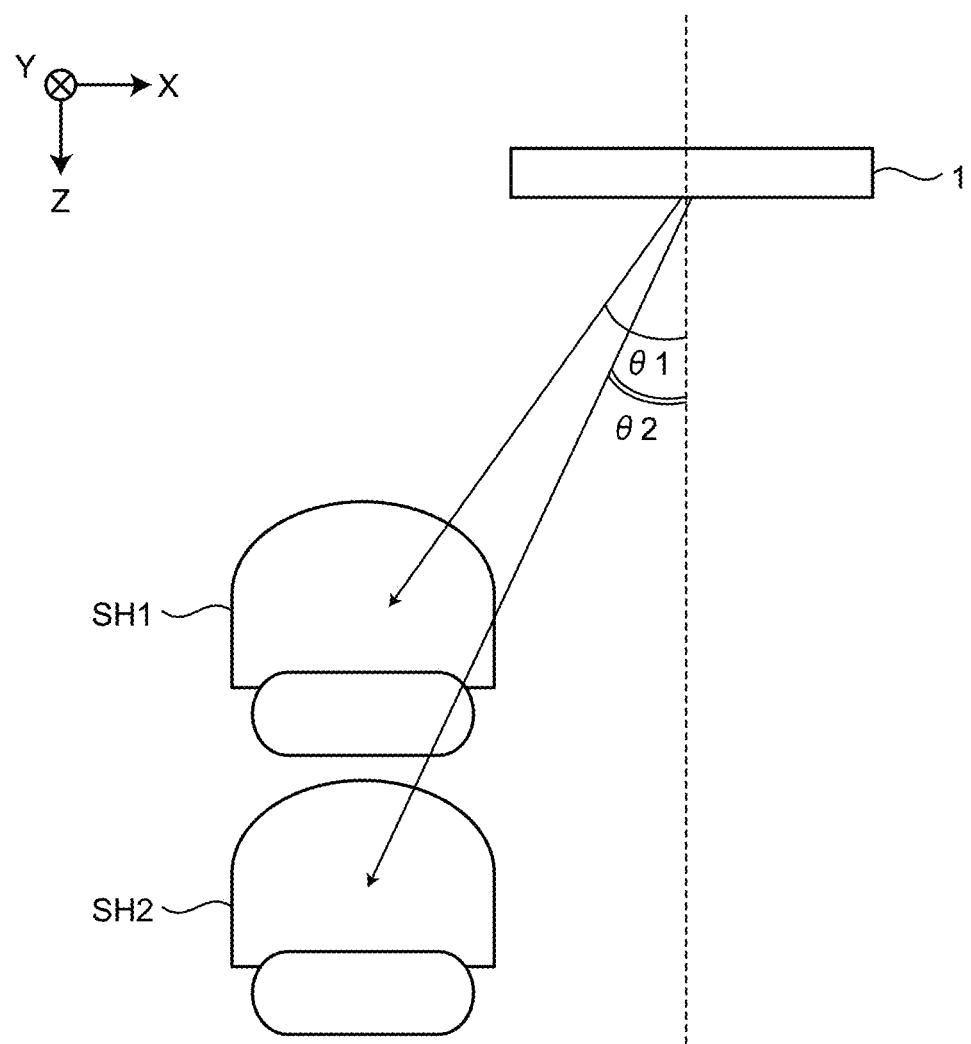
FIG. 18 is a schematic diagram illustrating an example of the position-angle relation between the display device and a seat in which a user who obliquely views an image on the display device is assumed to be seated.

FIG. 18 is a schematic diagram illustrating an example of the position-angle relation between the display device 1 and seats SH1 and SH2 in which a user who obliquely views the image on the display device 1 is assumed to be seated. For example, the view angle of a user seated in the seat SH1 is assumed to be a view angle θ1 in the position-angle relation between the display device 1 and the seats SH1 and SH2, which is illustrated in FIG. 18. The view angle of a user seated in the seat SH2 is assumed to be a view angle θ2. In a case where the seats SH1 and SH2 and the display device 1 are provided in a vehicle such as a four-wheel vehicle and the seat SH1 is the driver seat of the vehicle, it is desirable that the user seated in the seat SH1 cannot view the image on the display device 1 while driving the vehicle. Thus, the voltage that is applied to the liquid crystal LM with which the polar angle corresponding to the view angle θ1 is included in the view angle range in which the normalized transmittance is substantially zero, is set to the display device 1 so that the user seated in the seat SH1 cannot view the image on the display device 1 when the display device 1 is in the second state. Moreover, operation control of the display device 1 is performed so that the display device 1 is caused to be in the first state while the vehicle is stopping and the display device 1 is caused to be in the second state while the vehicle is not stopping, whereby the user seated in the seat SH1 cannot view the image on the display device 1 while driving the vehicle.

In a case where there is no problem with image viewing by the user seated in the seat SH2, the cut angle may be set as an angle between the view angles θ1 and θ2 so that the user seated in the seat SH2 can view the image on the display device 1.

The positional relation between the display device 1 and a user who obliquely views the image on the display device 1 is not limited to a predetermined relation. A configuration with which the positional relation between the display device 1 and a user who obliquely views the image on the display device 1 can be set in a variable manner will be described below with reference to FIG. 19.

Figure 19:
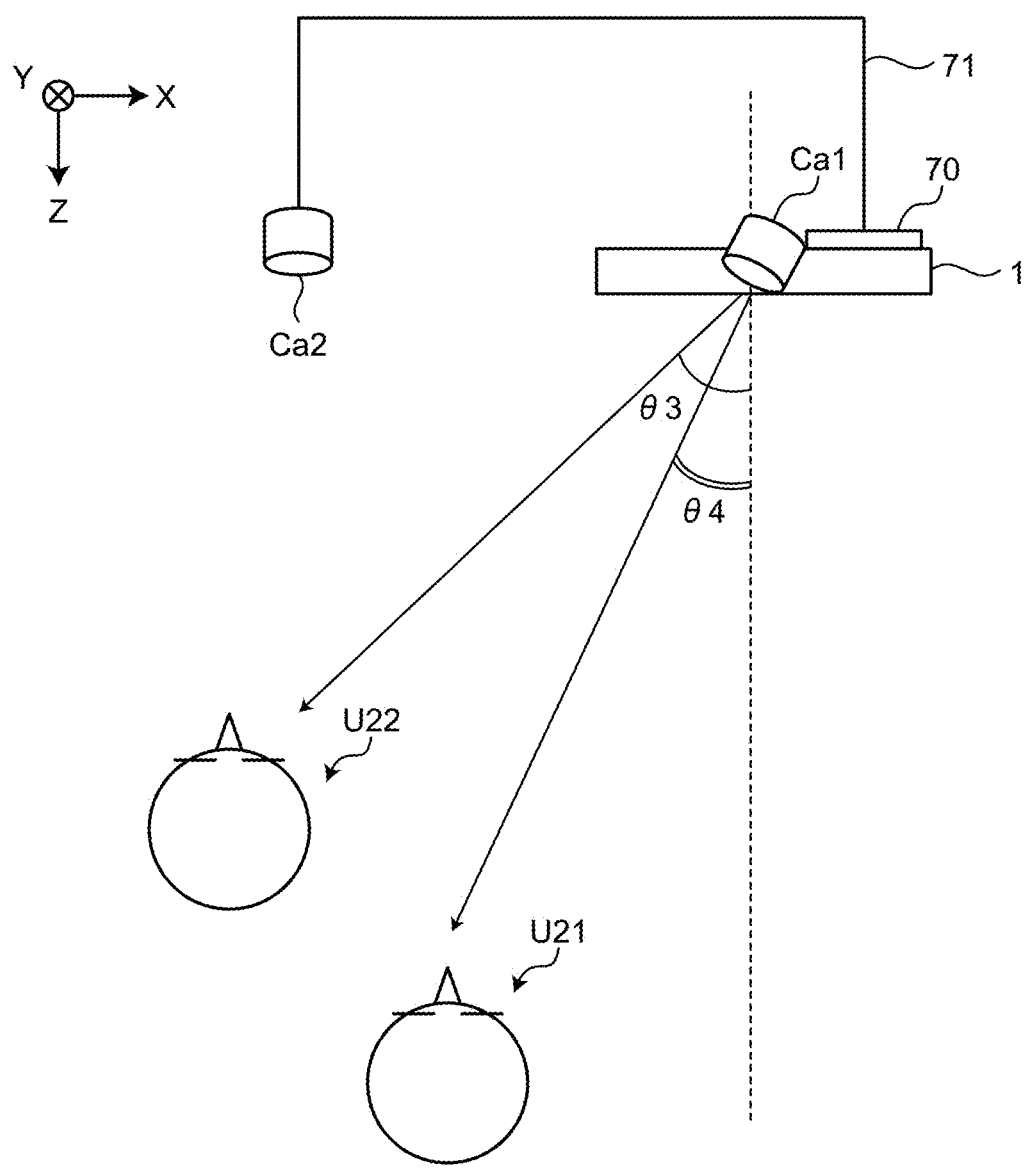
FIG. 19 is a schematic diagram illustrating an example of a configuration in which a camera is used to identify the position-angle relation between a user and the display device.

FIG. 19 is a schematic diagram illustrating an example of a configuration in which cameras Ca1 and Ca2 are used to specify the position-angle relation between users U21 and U22 and the display device 1. Each of the cameras Ca1 and Ca2 includes an image capturing element and a circuit configured to generate image data in accordance with an output from the image capturing element, and functions as what is called a digital camera. The image capturing element is, for example, a complementary metal oxide semiconductor (CMOS) image sensor but not limited thereto and may be another component such as a charge coupled device (CCD) image sensor, which functions in a similar manner.

The camera Ca1 is disposed on a central line of the display device 1 in the first direction X, and disposition of the camera Ca in the third direction Z is substantially the same as that of the display device 1. The angle of field of the camera Ca1 is directed toward the display output side of the display device 1. The position of a user captured in the image capturing range of the camera Ca1 can be associated with the view angle control of the display device 1. For example, the view angle of the user U22 is assumed to be a view angle θ3. The view angle of the user U21 is assumed to be a view angle θ4. In other words, an image capturing position of the user U22 in the image capturing range of the camera Ca1 is associated with the view angle θ3, and an image capturing position of the user U21 is associated with the view angle θ4, whereby the view angle control of the display device 1 can be achieved based on an image captured by the camera Ca1. For example, the cut angle can be set as an angle between the view angles θ3 and θ4 based on an image capturing result of the camera Ca1 so that image viewing is not allowed for the user U22 but is allowed for the user U21. This configuration is not limited to the view angles θ3 and θ4 but is also applicable to any other view angle by performing association with the position of a user in the image capturing range of the camera Ca1 as appropriate.

Disposition of a camera that performs image capturing for view angle control of the display device 1 is not limited to the disposition of the camera Ca1 illustrated in FIG. 19. For example, the camera may be disposed at a position separated from the display device 1 in the first direction X like the camera Ca2. In this case as well, the position of a user in the image capturing range is associated with the view angle thereof in advance so that view angle control of the display device 1 can be achieved in accordance with the position of a user subjected to image capturing in the image capturing range. View angle control may be comprehensively performed based on image capturing results of a plurality of respective cameras (for example, the cameras Ca1 and Ca2).

Control of the voltage applied to the liquid crystal LM based on an image captured by an image capturing device such as the camera Ca1 or Ca2, in other words, control of the potential difference between the electrodes FE2 and FE1 based on an image captured by an image capturing device such as the camera Ca1 or Ca2, is performed by, for example, a controller 70 illustrated in FIG. 19. The controller 70 includes a circuit configured to implement a plurality of functions. The circuit is, for example, a System on a Chip (SoC) but not limited thereto and may include a plurality of chips having different functions, respectively. The circuit has a function to perform image processing such as pattern matching and identify an image of a user (for example, the user U21 or U22) included in an image captured by the image capturing device. The circuit also has a function to perform arithmetic processing of identifying, from the position of a user identified based on the image processing, the position-angle relation between a user at the position and the display device 1. The circuit further has a function to determine the voltage that is applied to the liquid crystal LM based on the position-angle relation between the user and the display device 1, which is identified by the arithmetic processing, and control the display device 1 such that the display device 1 operates in the second state with the determined voltage that is applied thereto.

The camera Ca1 and the controller 70 are coupled to each other through wiring in the display device 1. In the case of the example illustrated in FIG. 19, the camera Ca2 and the controller 70 are coupled to each other through wiring 71, but transmission and reception of captured image data therebetween may be performed through wireless communication.

In FIG. 19, the controller 70 protruding on the back surface side of the display device 1 is provided for clear illustration, but the form of the controller 70 is not limited thereto. For example, a circuit configured to function as the controller 70 may be provided on a circuit board provided in the display device 1. Although not illustrated except for FIG. 19, at least a component (for example, a circuit such as a SoC) having, among functions of the controller 70, a function to control the voltage that is applied to the liquid crystal LM when the display device 1 operates in the second state is provided at the display device 1 like the controller 70 illustrated in FIG. 19. In a case where the positional relation between the display device 1 and a user is assumed in advance as described above with reference to FIG. 18, the component preliminarily holds setting data indicating voltage to be applied to the liquid crystal LM for achieving the second state with the cut angle corresponding to the assumption, and controls the voltage that is applied to the liquid crystal LM in accordance with the setting data.

As described above, according to the embodiment, the display device 1 includes the display panel 30 having the display region AA configured to output an image, the light source 60 configured to emit light toward the one surface side of the display panel 30, the liquid crystal panel 20 interposed between the display panel 30 and the light source 60 and provided to be able to change the transmission degree of light between the display panel 30 and the light source 60, and a controller (for example, the controller 70) configured to control the potential difference between the two electrodes FE1 and FE2 facing each other with liquid crystal interposed therebetween in the liquid crystal panel 20. The liquid crystal panel 20 in operation causes the transmission degree of light tilted toward one side in the longitudinal direction (for example, the first direction X) of the display panel 30 in a rectangular shape with respect to the direction (for example, the third direction Z) in which the display panel 30 and the light source 60 face each other and the transmission degree of light tilted toward the other side in the longitudinal direction to be different from each other. The potential difference corresponds to the angle (for example, the polar angle on the negative (−) side) of tilt with a smaller transmission degree of light when the liquid crystal panel 20 is in operation.

Accordingly, the potential difference between the two electrodes FE1 and FE2 facing each other with liquid crystal interposed therebetween in the liquid crystal panel 20 can be set so that image viewing is difficult or impossible by a user viewing the display device 1 at the angle of tilt with a smaller transmission degree of light when the liquid crystal panel 20 is in operation, in other words, at a position and an angle where it is not desirable to be able to view an image on the display device 1 when the liquid crystal panel 20 is in operation. Thus, the potential difference can be controlled in accordance with the position-angle relation between the display device 1 and the user so that it is difficult or impossible to view the image by the user when the liquid crystal panel 20 is in operation. In this manner, according to the embodiment, it is possible to more flexibly set a view angle range in which the image can be viewed.

The angle of tilt with the lowest transmission degree of light when the liquid crystal panel 20 is in operation is included in either the one side (for example, the negative (−) side) or the other side (for example, the positive (+) side), and the angle of tilt with the lowest transmission degree of light is smaller as the potential difference between the two electrodes FE1 and FE2 facing each other with liquid crystal interposed therebetween in the liquid crystal panel 20 is larger. Thus, a view angle range in which the image can hardly or cannot be viewed when the liquid crystal panel 20 is in operation can be more flexibly controlled by controlling the potential difference.

The potential difference between the two electrodes FE1 and FE2 facing each other with liquid crystal interposed therebetween in the liquid crystal panel 20 corresponds to a view angle at which it is assumed to be difficult or impossible to view the image when the liquid crystal panel 20 is in operation in the view angle range in which it is possible to view the image when the liquid crystal panel 20 is not in operation. Thus, it can be made difficult or impossible to view the image by a user viewing the display device 1 at the view angle.

The display device 1 further includes an image capturing device (for example, the camera Ca1 or Ca2) having an image capturing range including the view angle range of the display device 1 when the liquid crystal panel 20 is not in operation, and the controller (for example, the controller 70) determines, based on an image captured by the image capturing device, the view angle at which it is assumed to be difficult or impossible to view the image when the liquid crystal panel 20 is in operation. Thus, it is possible to perform more highly accurate view angle control corresponding to the position-angle relation between the display device 1 and the user.

Two of the liquid crystal panels 20 are provided, one (for example, the first liquid crystal panel 20A) of the two liquid crystal panels 20 is provided as an E-mode liquid crystal panel, and the other (for example, the second liquid crystal panel 20B) is provided as an O-mode liquid crystal panel. With this configuration, it is possible to achieve image display output utilizing both the advantage of the E-mode liquid crystal panel and the advantage of the O-mode liquid crystal panel. The advantage of the E-mode liquid crystal panel is steep decline in the transmittance of light for the line of light at a specific angle (for example, at or near the view angle of −30°). The advantage of the O-mode liquid crystal panel is stable decline in the transmittance of light in a broader range (for example, on the negative (−) side of the view angle of −30°). Any of the E-mode and O-mode liquid crystal panels can transmit light with which the image can be sufficiently viewed in a view angle range except for a view angle range in which the transmittance of light decreases significantly. In this manner, according to the embodiment, it is possible to simultaneously establish the view angle range in which the image can be viewed and the view angle range in which the image cannot be viewed, and more reliably ensure a wider view angle range in which the image cannot be viewed.

The positional relation between the E-mode liquid crystal panel and the O-mode liquid crystal panel between the display panel (display panel 30) and the light source (light source 60) may be the inverse of that in the embodiment. In this case, the relation between the transmission axis direction and the absorption axis direction of each of the first polarization layer 11, the second polarization layer 12, and the third polarization layer 13 may be inverted. The slow axis directions V02 and V08 of the retardation generation layers 51 and 52 may be changed so that the slow axis directions are line symmetric with respect to the second direction Y.

In the embodiment, the light adjuster 10 includes the two liquid crystal panels 20, but the number of liquid crystal panels 20 is not limited to two but may be one or may be equal to or larger than three. In a case where a configuration in which the number of liquid crystal panels 20 is different from that in the embodiment is employed, it is possible to form the transmission path LV of light as in the embodiment by adding or changing optical members such as a polarization layer and a retardation generation layer as appropriate in accordance with the angle of polarization.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:
a display panel having a display region configured to output an image;
a light source configured to emit light toward one surface side of the display panel;
a liquid crystal panel interposed between the display panel and the light source and provided to be able to change a transmission degree of light between the display panel and the light source; and
a controller configured to control a potential difference between two electrodes facing each other with liquid crystal interposed between the electrodes in the liquid crystal panel, wherein
the liquid crystal panel in operation makes a transmission degree of light tilted toward one side in a longitudinal direction of the display panel in a rectangular shape with respect to a direction in which the display panel and the light source face each other and a transmission degree of light tilted toward the other side in the longitudinal direction to be different from each other, and
the potential difference corresponds to an angle of tilt with a smaller transmission degree of light when the liquid crystal panel is in operation,
two of the liquid crystal panels are provided, and
one of the two liquid crystal panels is provided as an E-mode liquid crystal panel, and the other is provided as an O-mode liquid crystal panel.

2. The display device according to claim 1, wherein
an angle of tilt with a lowest transmission degree of light when the liquid crystal panel is in operation is included in either the one side or the other side, and
the angle of tilt with the lowest transmission degree of light is smaller as the potential difference is larger.

3. The display device according to claim 1, wherein the potential difference corresponds to a view angle at which it is assumed to be difficult or impossible to view the image when the liquid crystal panel is in operation and a view angle range in which it is possible to view the image when the liquid crystal panel is not in operation.

4. The display device according to claim 3, further comprising an image capturing device having an image capturing range including the view angle range, wherein
the controller is configured to determine, based on an image captured by the image capturing device, the view angle at which it is assumed to be difficult or impossible to view the image when the liquid crystal panel is in operation.

* * * * *